United States Patent
Richley et al.

(10) Patent No.: US 10,261,169 B2
(45) Date of Patent: Apr. 16, 2019

(54) METHOD FOR ITERATIVE TARGET LOCATION IN A MULTIPLE RECEIVER TARGET LOCATION SYSTEM

(71) Applicant: Zebra Technologies Corporation, Lincolnshire, IL (US)

(72) Inventors: Edward A. Richley, Gaithersburg, MD (US); Belinda Turner, Germantown, MD (US); Chang Wang, Boyds, MD (US)

(73) Assignee: Zebra Technologies Corporation, Lincolnshire, IL (US)

( * ) Notice: Subject to any disclaimer, the term of this patent is extended or adjusted under 35 U.S.C. 154(b) by 136 days.

(21) Appl. No.: 14/729,761

(22) Filed: Jun. 3, 2015

(65) Prior Publication Data

US 2016/0097837 A1  Apr. 7, 2016

Related U.S. Application Data

(60) Provisional application No. 62/008,239, filed on Jun. 5, 2014.

(51) Int. Cl.
*H04W 24/00* (2009.01)
*G01S 5/06* (2006.01)
*G01S 5/02* (2010.01)

(52) U.S. Cl.
CPC ............... *G01S 5/06* (2013.01); *G01S 5/02* (2013.01); *G01S 5/0215* (2013.01); *G01S 5/0221* (2013.01)

(58) Field of Classification Search
CPC .................................................. G01S 5/0215

(Continued)

(56) References Cited

U.S. PATENT DOCUMENTS 3,732,500 A   5/1973 Dishal et al.
4,270,145 A   5/1981 Farina
(Continued)

FOREIGN PATENT DOCUMENTS

EP   1235077 A2   8/2002
EP   1241616 A2   9/2002
(Continued)

OTHER PUBLICATIONS

Yongcai Wang, "An Algorithmic and Systematic Approach for Improving Robustness of TOA-based Localization"; 2013 IEEE International Conference on High Performance Computing and Communications & 2013 IEEE International Conference on Embedded and Ubiquitous Computing.*

(Continued)

*Primary Examiner* — Suhail Khan

(57) ABSTRACT

The present invention provides methods for an active RFID tag target location system that provides for an iterative recalculating of a target location estimate by successively testing receiver TOA and DTOA error measurements and discarding outlier receivers. The present invention works to reduce the erratic effects that multipath channel interference and random noise play in target location systems due to incorrect identification of the main pulse of the transmit signal. In addition to providing for a greater accuracy and consistency in a TOA-based target location system, the method also provides for an opportunity to reduce a transmission bandwidth associate with the TOA transmission by the multiple receivers. The method may be considered a post-processing element, as the determination of TOA and DTOA may require a real-time calculation, where the timing constraints for the ensuing target location estimate may be less severe.

21 Claims, 11 Drawing Sheets

(58) Field of Classification Search
USPC ........................................................ 342/465
See application file for complete search history.

(56) References Cited

U.S. PATENT DOCUMENTS

| | | | |
|---|---|---|---|
| 5,046,133 | A | 9/1991 | Watanabe et al. |
| 5,119,104 | A | 6/1992 | Heller |
| 5,469,409 | A | 11/1995 | Anderson et al. |
| 5,513,854 | A | 5/1996 | Daver |
| 5,645,077 | A | 7/1997 | Foxlin |
| 5,699,244 | A | 12/1997 | Clark et al. |
| 5,901,172 | A | 5/1999 | Fontana et al. |
| 5,920,287 | A | 7/1999 | Belcher et al. |
| 5,930,741 | A | 7/1999 | Kramer |
| 5,990,825 | A | 11/1999 | Ito |
| 5,995,046 | A | 11/1999 | Belcher et al. |
| 6,028,626 | A | 2/2000 | Aviv |
| 6,121,926 | A | 9/2000 | Belcher et al. |
| 6,176,837 | B1 | 1/2001 | Foxlin |
| 6,204,813 | B1 | 3/2001 | Wadell et al. |
| 6,366,242 | B1 | 4/2002 | Boyd et al. |
| 6,380,894 | B1 | 4/2002 | Boyd et al. |
| 6,593,885 | B2 | 7/2003 | Wisherd et al. |
| 6,655,582 | B2 | 10/2003 | Wohl et al. |
| 6,710,713 | B1 | 3/2004 | Russo |
| 6,812,884 | B2 | 11/2004 | Richley et al. |
| 6,836,744 | B1 | 12/2004 | Asphahani et al. |
| 6,882,315 | B2 | 4/2005 | Richley et al. |
| 7,009,638 | B2 | 3/2006 | Gruber et al. |
| 7,190,271 | B2 | 3/2007 | Boyd |
| 7,263,133 | B1 | 8/2007 | Miao |
| 7,667,604 | B2 | 2/2010 | Ebert et al. |
| 7,671,802 | B2 | 3/2010 | Walsh et al. |
| 7,710,322 | B1 | 5/2010 | Ameti et al. |
| 7,739,076 | B1 | 6/2010 | Vock et al. |
| 7,755,541 | B2 | 7/2010 | Wisherd et al. |
| 7,899,006 | B2 | 3/2011 | Boyd |
| 7,969,348 | B2 | 6/2011 | Baker et al. |
| 8,009,727 | B2 | 8/2011 | Hui et al. |
| 8,023,917 | B2 | 9/2011 | Popescu |
| 8,077,981 | B2 | 12/2011 | Elangovan et al. |
| 8,269,835 | B2 | 9/2012 | Grigsby |
| 8,279,051 | B2 | 10/2012 | Khan |
| 8,289,185 | B2 | 10/2012 | Alonso |
| 8,457,392 | B2 | 6/2013 | Cavallaro et al. |
| 8,477,046 | B2 | 7/2013 | Alonso |
| 8,568,278 | B2 | 10/2013 | Riley et al. |
| 8,665,152 | B1 | 3/2014 | Kling et al. |
| 8,696,458 | B2 | 4/2014 | Foxlin et al. |
| 8,705,671 | B2 | 4/2014 | Ameti et al. |
| 8,775,916 | B2 | 7/2014 | Pulsipher et al. |
| 8,795,045 | B2 | 8/2014 | Sorrells et al. |
| 8,842,002 | B2 | 9/2014 | Rado |
| 8,780,204 | B2 | 10/2014 | DeAngelis et al. |
| 8,989,880 | B2 | 3/2015 | Wohl et al. |
| 9,081,076 | B2 | 7/2015 | DeAngelis et al. |
| 9,185,361 | B2 | 11/2015 | Curry |
| 9,381,645 | B1 | 7/2016 | Yarlagadda et al. |
| 2001/0010541 | A1 | 8/2001 | Fernandez et al. |
| 2001/0030625 | A1 | 10/2001 | Doles et al. |
| 2002/0004398 | A1 | 1/2002 | Ogino et al. |
| 2002/0041284 | A1 | 4/2002 | Konishi et al. |
| 2002/0114493 | A1 | 8/2002 | McNitt et al. |
| 2002/0116147 | A1 | 8/2002 | Vock et al. |
| 2002/0130835 | A1 | 9/2002 | Brosnan |
| 2002/0135479 | A1 | 9/2002 | Belcher et al. |
| 2003/0090387 | A1 | 5/2003 | Lestienne et al. |
| 2003/0095186 | A1 | 5/2003 | Aman et al. |
| 2003/0128100 | A1 | 7/2003 | Burkhardt et al. |
| 2003/0163287 | A1 | 8/2003 | Vock et al. |
| 2003/0227453 | A1 | 12/2003 | Beier et al. |
| 2004/0022227 | A1 | 2/2004 | Lynch et al. |
| 2004/0062216 | A1 | 4/2004 | Nicholls et al. |
| 2004/0108954 | A1 | 6/2004 | Richley et al. |
| 2004/0178960 | A1 | 9/2004 | Sun |
| 2004/0189521 | A1* | 9/2004 | Smith .................. G01S 13/723 342/387 |
| 2004/0249969 | A1 | 12/2004 | Price |
| 2004/0260470 | A1 | 12/2004 | Rast |
| 2004/0260828 | A1 | 12/2004 | Price |
| 2005/0026563 | A1 | 2/2005 | Leeper et al. |
| 2005/0031043 | A1 | 2/2005 | Paquelet |
| 2005/0059998 | A1 | 3/2005 | Norte et al. |
| 2005/0073418 | A1 | 4/2005 | Kelliher et al. |
| 2005/0075079 | A1 | 4/2005 | Jei et al. |
| 2005/0093976 | A1 | 5/2005 | Valleriano |
| 2005/0148281 | A1 | 7/2005 | Sanchez-Castro et al. |
| 2005/0207617 | A1 | 9/2005 | Sarnoff |
| 2006/0067324 | A1 | 3/2006 | Kim |
| 2006/0139167 | A1 | 6/2006 | Davie et al. |
| 2006/0164213 | A1 | 7/2006 | Burghard et al. |
| 2006/0252476 | A1 | 11/2006 | Bahou |
| 2006/0271912 | A1 | 11/2006 | Mickle et al. |
| 2006/0281061 | A1 | 12/2006 | Hightower et al. |
| 2007/0091292 | A1 | 4/2007 | Cho et al. |
| 2007/0176749 | A1 | 8/2007 | Boyd et al. |
| 2007/0296723 | A1 | 12/2007 | Willams |
| 2008/0065684 | A1 | 4/2008 | Zilberman |
| 2008/0106381 | A1 | 5/2008 | Adamec et al. |
| 2008/0113787 | A1 | 5/2008 | Alderucci |
| 2008/0129825 | A1 | 6/2008 | DeAngelis et al. |
| 2008/0140233 | A1 | 6/2008 | Seacat |
| 2008/0186231 | A1 | 8/2008 | Aljadeff et al. |
| 2008/0204248 | A1 | 8/2008 | Winget et al. |
| 2008/0224866 | A1 | 9/2008 | Rehman |
| 2008/0262885 | A1 | 10/2008 | Jain et al. |
| 2008/0266131 | A1 | 10/2008 | Richardson et al. |
| 2008/0269016 | A1 | 10/2008 | Ungari et al. |
| 2008/0281443 | A1 | 11/2008 | Rodgers |
| 2008/0285805 | A1 | 11/2008 | Luinge et al. |
| 2008/0291024 | A1 | 11/2008 | Zhang et al. |
| 2009/0048044 | A1 | 2/2009 | Oleson et al. |
| 2009/0231198 | A1 | 9/2009 | Walsh et al. |
| 2010/0026809 | A1 | 2/2010 | Curry |
| 2010/0045508 | A1 | 2/2010 | Ekbal et al. |
| 2010/0054304 | A1 | 3/2010 | Barnes et al. |
| 2010/0060452 | A1 | 3/2010 | Schuster et al. |
| 2010/0150117 | A1 | 6/2010 | Aweya et al. |
| 2010/0174506 | A1 | 7/2010 | Joseph et al. |
| 2010/0250305 | A1 | 9/2010 | Lee et al. |
| 2010/0278386 | A1 | 11/2010 | Hoeflinger |
| 2010/0283630 | A1* | 11/2010 | Alonso .................. H04Q 9/00 340/870.11 |
| 2010/0328073 | A1 | 12/2010 | Nikitin et al. |
| 2011/0002223 | A1 | 1/2011 | Gross |
| 2011/0025847 | A1 | 2/2011 | Park et al. |
| 2011/0054782 | A1 | 3/2011 | Kaahui et al. |
| 2011/0063114 | A1 | 3/2011 | Ikoyan |
| 2011/0064023 | A1 | 3/2011 | Yamamoto et al. |
| 2011/0084806 | A1 | 4/2011 | Perkins et al. |
| 2011/0134240 | A1 | 6/2011 | Anderson et al. |
| 2011/0140970 | A1 | 6/2011 | Fukagawa et al. |
| 2011/0169959 | A1 | 7/2011 | DeAngelis et al. |
| 2011/0188513 | A1 | 8/2011 | Christoffersson et al. |
| 2011/0261195 | A1 | 10/2011 | Martin et al. |
| 2011/0285585 | A1 | 11/2011 | Bergamo |
| 2011/0300905 | A1 | 12/2011 | Levi |
| 2011/0320322 | A1 | 12/2011 | Roslak et al. |
| 2012/0014278 | A1 | 1/2012 | Ameti et al. |
| 2012/0015665 | A1 | 1/2012 | Farley et al. |
| 2012/0024516 | A1 | 2/2012 | Bhadur et al. |
| 2012/0057634 | A1 | 3/2012 | Shi et al. |
| 2012/0057640 | A1 | 3/2012 | Shi et al. |
| 2012/0065483 | A1 | 3/2012 | Chung et al. |
| 2012/0081531 | A1 | 4/2012 | DeAngelis et al. |
| 2012/0112904 | A1 | 5/2012 | Nagy et al. |
| 2012/0126973 | A1 | 5/2012 | Deangelis et al. |
| 2012/0139708 | A1 | 6/2012 | Paradiso et al. |
| 2012/0184878 | A1 | 7/2012 | Najafi et al. |
| 2012/0212505 | A1 | 8/2012 | Burroughs et al. |
| 2012/0218301 | A1 | 8/2012 | Miller |
| 2012/0225676 | A1 | 9/2012 | Boyd et al. |
| 2012/0231739 | A1 | 9/2012 | Chen et al. |
| 2012/0246795 | A1 | 10/2012 | Scheffler et al. |

(56) References Cited

U.S. PATENT DOCUMENTS

| | | |
|---|---|---|
| 2012/0256745 A1 | 10/2012 | Plett et al. |
| 2012/0268239 A1 | 10/2012 | Ljung et al. |
| 2013/0003860 A1 | 1/2013 | Sasai et al. |
| 2013/0021142 A1 | 1/2013 | Matsui et al. |
| 2013/0021206 A1 | 1/2013 | Hach et al. |
| 2013/0041590 A1 | 2/2013 | Burich et al. |
| 2013/0066448 A1 | 3/2013 | Alonso |
| 2013/0076645 A1 | 3/2013 | Anantha et al. |
| 2013/0096704 A1 | 4/2013 | Case |
| 2013/0115904 A1 | 5/2013 | Kapoor et al. |
| 2013/0138386 A1 | 5/2013 | Jain et al. |
| 2013/0138518 A1 | 5/2013 | White et al. |
| 2013/0142384 A1 | 6/2013 | Ofek |
| 2013/0147608 A1 | 6/2013 | Sadr |
| 2013/0202062 A1 | 8/2013 | Sadr |
| 2013/0257598 A1 | 10/2013 | Kawaguchi et al. |
| 2013/0268185 A1 | 10/2013 | Rabbath et al. |
| 2013/0339156 A1 | 12/2013 | Sanjay et al. |
| 2014/0055588 A1 | 2/2014 | Bangera et al. |
| 2014/0062728 A1 | 3/2014 | Soto et al. |
| 2014/0145828 A1 | 5/2014 | Bassan-Eskenazi |
| 2014/0156036 A1 | 6/2014 | Huang |
| 2014/0170607 A1 | 6/2014 | Hsiao et al. |
| 2014/0173387 A1 | 6/2014 | Park et al. |
| 2014/0221137 A1 | 8/2014 | Krysiak et al. |
| 2014/0301427 A1 | 10/2014 | Khalaf-Allah |
| 2014/0320660 A1 | 10/2014 | DeAngelis et al. |
| 2014/0347193 A1 | 11/2014 | Ljung |
| 2014/0361875 A1 | 12/2014 | O'Hagan et al. |
| 2014/0361906 A1 | 12/2014 | Hughes et al. |
| 2014/0364141 A1 | 12/2014 | O'Hagan et al. |
| 2014/0365415 A1 | 12/2014 | Stelfox et al. |
| 2015/0002272 A1 | 1/2015 | Alonso et al. |
| 2015/0057981 A1 | 2/2015 | Gross |
| 2015/0085111 A1 | 3/2015 | Lavery |
| 2015/0097653 A1 | 4/2015 | Gibbs et al. |
| 2015/0358852 A1 | 12/2015 | Richley et al. |
| 2015/0360133 A1 | 12/2015 | MacCallum et al. |
| 2015/0375041 A1 | 12/2015 | Richley et al. |
| 2015/0375083 A1 | 12/2015 | Stelfox et al. |
| 2015/0379387 A1 | 12/2015 | Richley |
| 2016/0059075 A1 | 3/2016 | Molyneux et al. |
| 2016/0097837 A1 | 4/2016 | Richley et al. |

FOREIGN PATENT DOCUMENTS

| | | |
|---|---|---|
| EP | 1253438 A2 | 10/2002 |
| EP | 1503513 A1 | 2/2005 |
| EP | 2474939 A1 | 11/2012 |
| WO | WO-1998005977 A1 | 2/1998 |
| WO | WO 1999/061936 A1 | 12/1999 |
| WO | WO 01008417 | 2/2001 |
| WO | WO 2006/022548 | 3/2006 |
| WO | WO-2010/083943 A1 | 7/2010 |
| WO | WO 2015/051813 A1 | 4/2014 |
| WO | WO 2014197600 | 12/2014 |

OTHER PUBLICATIONS

Ismail Guvenc, "A Survey on TOA Based Wireless Localization & NLOS Mitigation Techniques"; IEEE Communications Surveys and Tutorials, vol. 11, No. 3, Third Quarter 2009.*

Swedberg, Claire, "USDA Researchers Develop System to Track Livestock Feeding Behavior Unobtrusively", RFID Journal, Jul. 18, 2013.

International Search Report and Written Opinion from International Application No. PCT/US2014/041062 dated Oct. 1, 2014.

International Search Report and Written Opinion from International Application No. PCT/US2014/040947 dated Oct. 9, 2014.

Fontana, R.J., Richley, E., Barney, J., "Commercialization of an Ultra Wideband Precision Asset Location System," *2003 IEEE Conference on Ultra Wideband Systems and Technologies*, Nov. 16-19, 2003.

Gueziec, A., "Tracking Pitches for Broadcast Television," *Computer*, Aug. 7, 2002.

CattleLog Pro, *eMerge Interactive, Inc.*, Sebastian, FL, 2004.

Marchant, J., Secure Animal Identification and Source Verification, *JM Communications*, UK, 2002.

"A Guide to Using NLIS Approved Ear Tags and Rumen Boluses," National Livestock Identification Scheme, *Meat & Livestock Australia Limited*, North Sydney, Australia, May 2003.

King, L., "NAIS Cattle ID Pilot Projects Not Needed, Since Proven Advanced Technology Already Exists," *ScoringSystem, Inc.*, Sarasota, FL, Dec. 27, 2005. (www.prweb.com/releases/2005/12prweb325888.htm).

"RFID in the Australian Meat and Livestock Industry," Allflex Australia Pty Ltd,Capalaba, QLD (AU), *Data Capture Suppliers Guide*, 2003-2004.

International Search Report and Written Opinion from International Application No. PCT/US2014/040881 dated Nov. 4, 2014.

Swedberg, C., "N.J. Company Seeks to Market Passive Sensor RFID Tags," *RFID Journal*, Jun. 20, 2013.

International Search Report and Written Opinion from International Application No. PCT/US2014/040940 dated Dec. 17, 2014.

International Search Report for International Application No. PCT/US2014/053647 dated Dec. 19, 2014.

International Search Report and Written Opinion for International Application No. PCT/US2016/035614 dated Sep. 15, 2016.

Zhu et al., "A Real-Time Articulated Human Motion Tracking Using Tri-Axis Inertial/Magnetic Sensors Package," IEEE Transactions on Neural Systems and Rehabilitation Engineering, vol. 12, No. 2, Jun. 2004, pp. 295-302.

Complaint before the United States District Court of Massachusetts, Civil Action No. 1:15-cv-12297, *Lynx System Developers, Inc. et al. v. Zebra Enterprise Solutions Corporation et al.*, filed Jun. 10, 2015.

Invention to Pay Additional Fees/Partial International Search Report for PCT/IB2015/054099 dated Oct. 6, 2015.

International Search Report and Written Opinion for International Application No. PCT/IB2015/054099 dated Dec. 9, 2015.

U.S. Appl. No. 14/296,703, filed Jun. 5, 2014; In re: Alonso et al., entitle Method and Apparatus for Associating Radio Frequency Identification Tags with Participants.

U.S. Appl. No. 61/895,548, filed Oct. 25, 2013, in re: Alonso et al., entitled "Method, Apparatus, and Computer Program Product for Collecting Sporting Event Data Based on Real Time Data for Proximity and Movement of Objects".

International Search Report and Written Opinion for International Application No. PCT/IB2015/059264 dated Feb. 10, 2016.

Jinyun Zhang et al., "UWB Systems for Wireless Sensor Networks", Proceedings of the IEEE, IEEE. New York, US, vol. 97, No. 2, Feb. 1, 2009 (Feb. 1, 2009), pp. 313-331.

International Search Report and Written Opinion for International Application No. PCT/US2015/034267 dated Sep. 25, 2015.

International Search Report and Written Opinion for International Application No. PCT/IB2015/054103 dated Aug. 14, 2015.

Cheong, P. et al., "Synchronization, TOA and Position Estimation for Low-Complexity LDR UWB Devices", Ultra-Wideband, 2005 IEEE International Conference, Zurich, Switzerland Sep. 5-8, 2005, Piscataway, NJ, USA, IEEE, Sep. 5, 2005, pp. 480-484.

International Search Report and Written Opinion for International Application No. PCT/IB2015/054213 dated Aug. 6, 2015.

Wang, Y. et al., "An Algorithmic and Systematic Approach from Improving Robustness of TOA-Based Localization", 2013 IEEE 10th International Conference on High Performance Computing and Communications & 2013 IEEE, Nov. 13, 2013, pp. 2066-2073.

Guvenc, I. et al., "A Survey on TOA Based Wireless Localization and NLOA Mitigation Techniques", IEEE Communications Surveys, IEEE, New York, NY, US, vol. 11, No. 3, Oct. 1, 2009, pp. 107-124.

International Search Report and Written Opinion for International Application PCT/IB2015/054102 dated Nov. 4, 2015.

"Seattleite wins top prize in Microsoft's Super Bowl tech Contest", San Francisco AP, Komonews.com, Feb. 6, 2016. <http://komonews.com/news/local/seattleite-wins-top-prize-in-microsofts-super-bowl-tech-contest>.

(56) References Cited

OTHER PUBLICATIONS

Bahle et al., "I See You: How to Improve Wearable Activity Recognition by Leveraging Information from Environmental Cameras," Pervasive Computing and Communications Workshops, IEEE International Conference, (Mar. 18-22, 2013)

Teixeira et al., "Tasking Networked CCTV Cameras and Mobile Phones to Identify and Localize Multiple People," Ubicomp '10 Proceedings of the 12th ACM International Conference on Ubiquitous Computing, pp. 213-222 (Sep. 26-29, 2010)

Complaint before the United States District Court of Massachusetts, Civil Action No. 1:15-cv-12297, *Lynx System Developers, Inc. et al. V. Zebra Enterprise Solutions Corporation et al.*, filed Mar. 23, 2016.

Defendant's Answer to Complaint before the United States District Court of Massachusetts, Civil Action No. 1:15-cv-12297, *Lynx System Developers, Inc. et al. V. Zebra Enterprise Solutions Corporation et al.*, filed Apr. 6, 2016.

Canadian Intellectual Property Office, "Examination Report," issued in connection with Canadian patent application No. 2,951,120 dated Oct. 24, 2017 (10 pages).

Canadian Intellectual Property Office, "Examination Report," issued in connection with Canadian patent application No. 2,951,120, dated Oct. 4, 2018 (10 pages).

Sanpechuda T. et al., "A review of RFID localization: Applications and techniques," 5th International Conference on Electrical Engineering/ Electronics, Computer, Telecommunications and Information, Jun. 2008 (5 pages).

\* cited by examiner

METHOD FOR ITERATIVE TARGET LOCATION IN A MULTIPLE RECEIVER TARGET LOCATION SYSTEM

CROSS-REFERENCE TO RELATED APPLICATION

This application claims the benefit of U.S. Provisional Application 62/008,239 filed Jun. 5, 2014, the entire contents of which are incorporated herein by reference.

FIELD

Embodiments discussed herein are related to radio frequency locating and, more particularly, to systems, methods, apparatuses, computer readable media and other means for target location by high-resolution time-of-arrival (TOA) determination in a multiple receiver target location system.

BACKGROUND

A number of deficiencies and problems associated with UWB Real Time Locating Systems particularly related to target location accuracy are identified herein. Through applied effort, ingenuity, and innovation, exemplary solutions too many of these identified problems are embodied by the present invention, which is described in detail below.

BRIEF SUMMARY OF THE INVENTION

Systems, methods, apparatuses, and computer readable media are disclosed for providing iterative target location in a multiple receiver target location system. A brief summary is provided in the following.

In an example embodiment, a method, apparatus, and computer program product for determining target location in a multiple receiver target location system is provided including receiving, from a plurality of receivers, time of arrival (TOA) data associated with a location tag transmission, determining a candidate combination based on the received TOA data, calculating a tag location estimate for each candidate combination, determining a data quality indicator (DQI) for each tag location estimate, and determining a DQI adjusted solution having the lowest DQI from the tag location estimates.

In some example embodiments, the method, apparatus, and computer program product also comprises generating at least one supplemental candidate combination by discarding at least one TOA data, calculating a supplemental tag location estimate for each supplemental candidate combination, determining a DQI for each supplemental tag location estimate, and determining a supplemental DQI adjusted solution having the lowest DQI from the supplemental tag location estimates. In some example embodiments of the method, apparatus, and computer program product, generating the at least one supplemental candidate combination by discarding the TOA data also includes determining a largest negative TOA error value and removing a selected TOA data associated with the largest negative TOA error value.

In some example embodiments of the method, apparatus, and computer program product, the generating at least one supplemental candidate combination, calculating a supplemental tag location estimate, and determining a supplemental DQI adjusted solution are performed iteratively. In some example embodiments, the method, apparatus, and computer program product also includes determining if the DQI adjusted solution having the lowest DQI satisfies a predetermined quality threshold and outputting the tag location estimate in an instance in which the DQI adjusted solution satisfies the predetermined quality threshold. In some example embodiments, the method, apparatus, and computer program product also includes determining whether candidate receiver TOA data is available for removal and outputting a location failure in an instance in which there is no candidate receiver TOA data available for removal.

In some example embodiments of the method, apparatus, and computer program product, the determining whether candidates are available for removal also includes determining a number of receivers associated with the received TOA data and comparing the number of receivers associated with the received TOA data to a predetermined minimum receiver quantity threshold. In some example embodiments of the method, apparatus, and computer program product, the minimum receiver quantity threshold comprises a predetermined number of receivers. In some example embodiments of the method, apparatus, and computer program product, the minimum receiver quantity threshold comprises a predetermined percentage of receivers of a receiver grid.

In a further example embodiment, a method, apparatus, and computer program product for determining target location in a multiple receiver target location system are provided including receiving, from a plurality of receivers, time of arrival (TOA) data associated with a location tag transmission, calculating a tag location estimate based on the TOA data, determining a largest error TOA data, removing the largest error TOA data, and recalculating the tag location estimate based on the TOA data associated with the tag transmission without the largest error TOA data.

In some example embodiments, the method, apparatus, and computer program product also include determining if a minimization function value associated with the tag location estimate satisfies a predetermined threshold and outputting the tag location estimate in an instance in which the minimization function value satisfies the predetermined threshold. In some example embodiments, the method, apparatus, and computer program product also include determining if a number of receivers associated with the TOA data satisfies a predetermined threshold and outputting an error in an instance in which the number of receivers fails to satisfy the predetermined threshold.

In some example embodiments of the method, apparatus, and computer program product, the determining the largest error TOA data, removing the largest error TOA data, and recalculating the tag location estimate are performed iteratively. In some example embodiments of the method, apparatus, and computer program product, the largest error TOA data is a most negative value indicative of a late receipt of the location tag transmission.

In another example embodiment, a method, apparatus, and computer program product for determining target location in a multiple receiver target location system are provided including receiving, from a plurality of receivers, time of arrival (TOA) data associated with a location tag transmission, calculating tag location and associated TOA errors using a minimization function, recording the tag location, TOA errors, and receiver combinations associated with the TOA data, determining the calculated receiver combinations satisfy a receiver combination threshold, selecting a new combination of receivers in an instance in which the receiver combination threshold has not been satisfied, selecting TOA data associated with the new combination of receivers, and calculating a tag location and associated TOA errors using the minimization function for the TOA data associated with the new combination of receivers.

In some example embodiments, the method, apparatus, and computer program product also include determining if the TOA error for the TOA data associated with the new combination of receiver is a smallest error of the calculated minimization functions and recording the tag location, TOA errors, and receiver combination for the TOA data associated with the new combination of receivers, in an instance in which the TOA error for the TOA data associated with the new combination of receiver is the smallest error of the calculated minimization functions.

BRIEF DESCRIPTION OF THE SEVERAL VIEWS OF THE DRAWINGS

Figure 1:
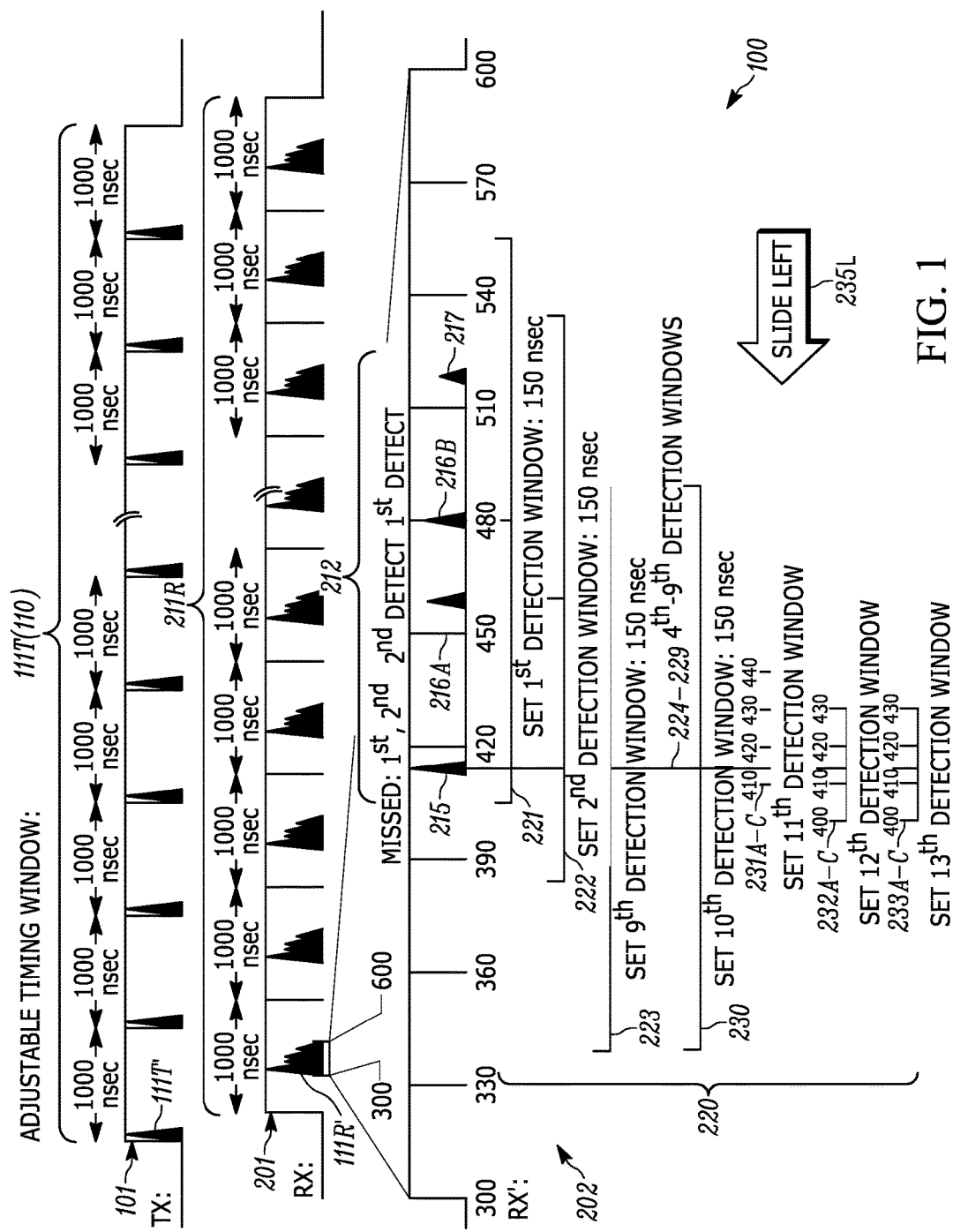
Figure 2:
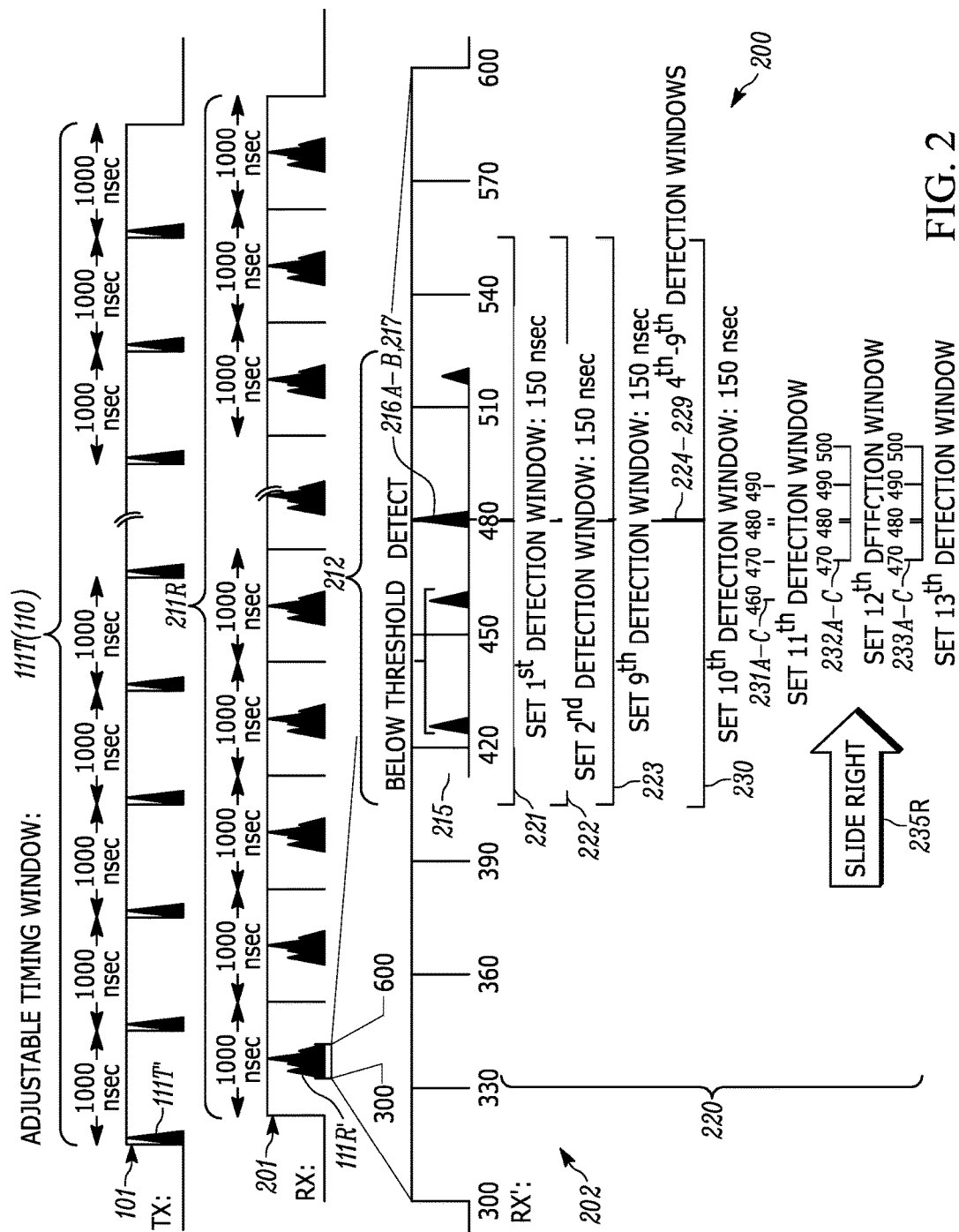
Figure 3A:
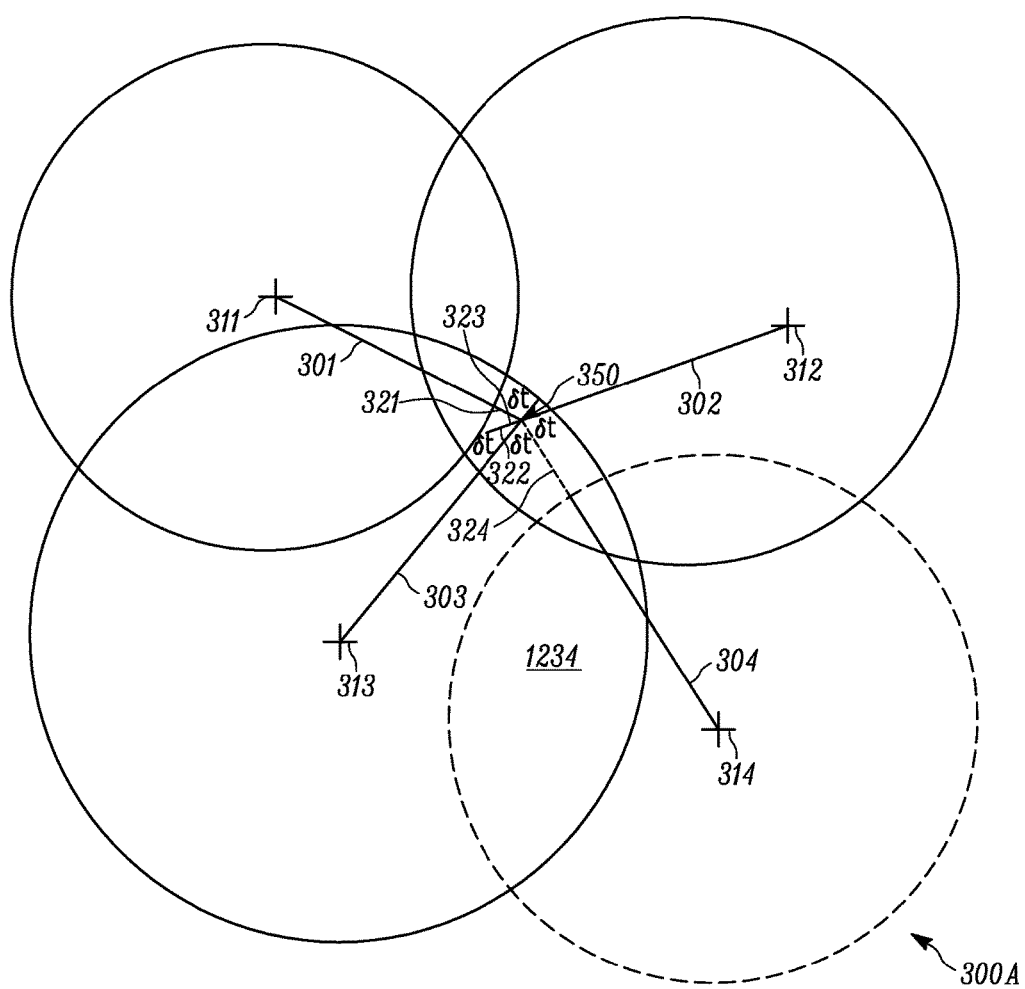
Figure 3B:
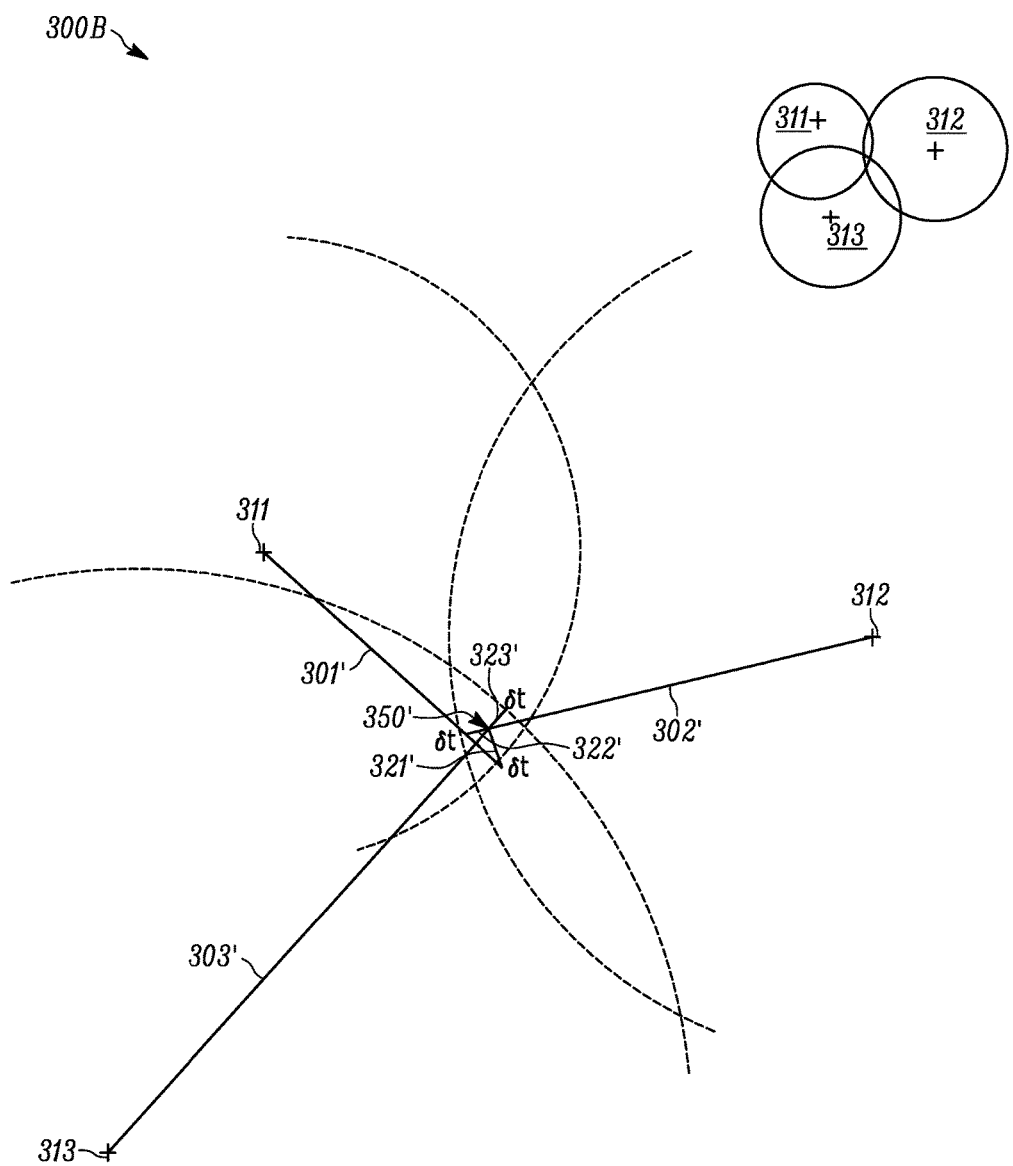
Figure 3C:
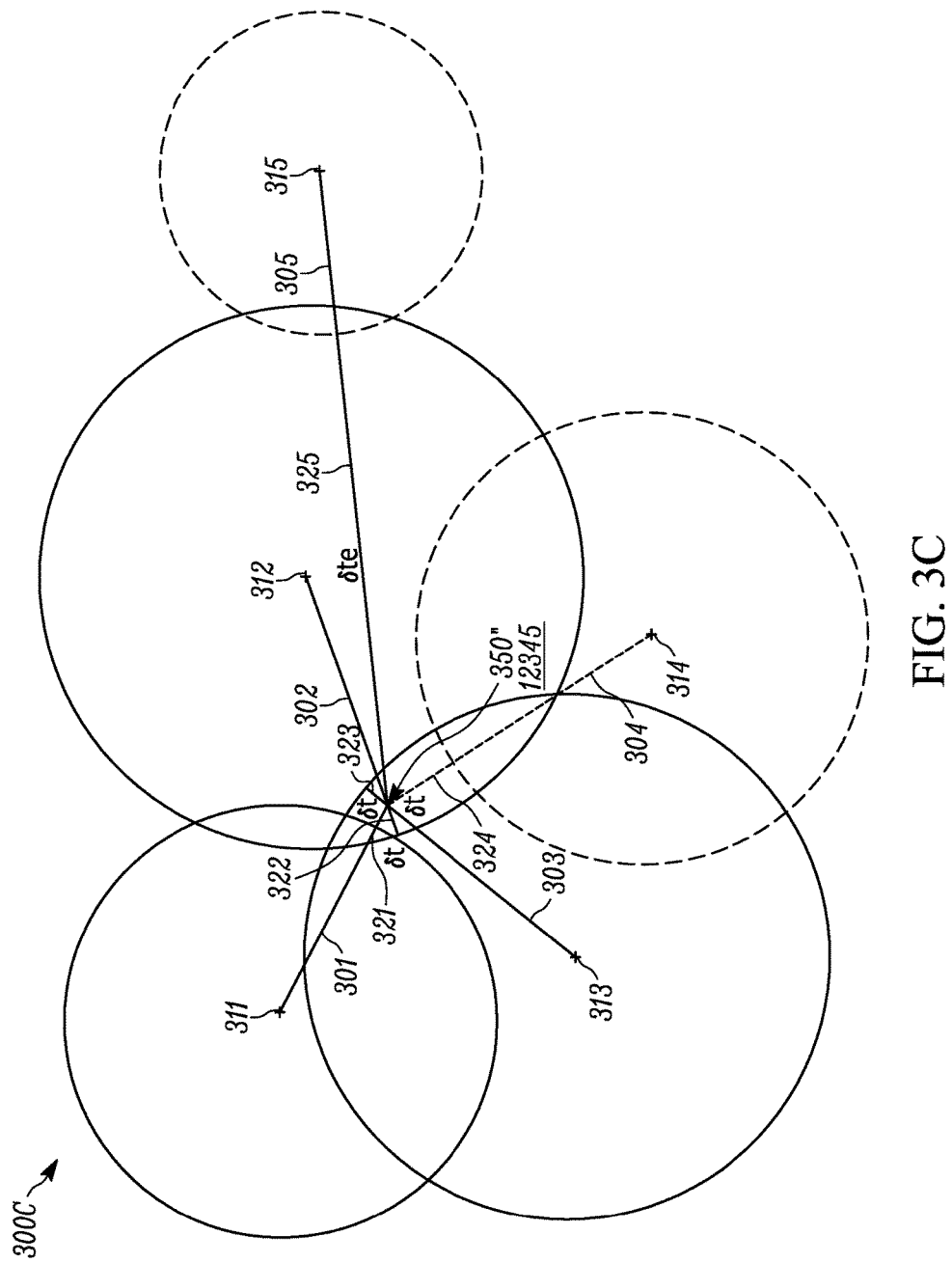
Figure 4A:
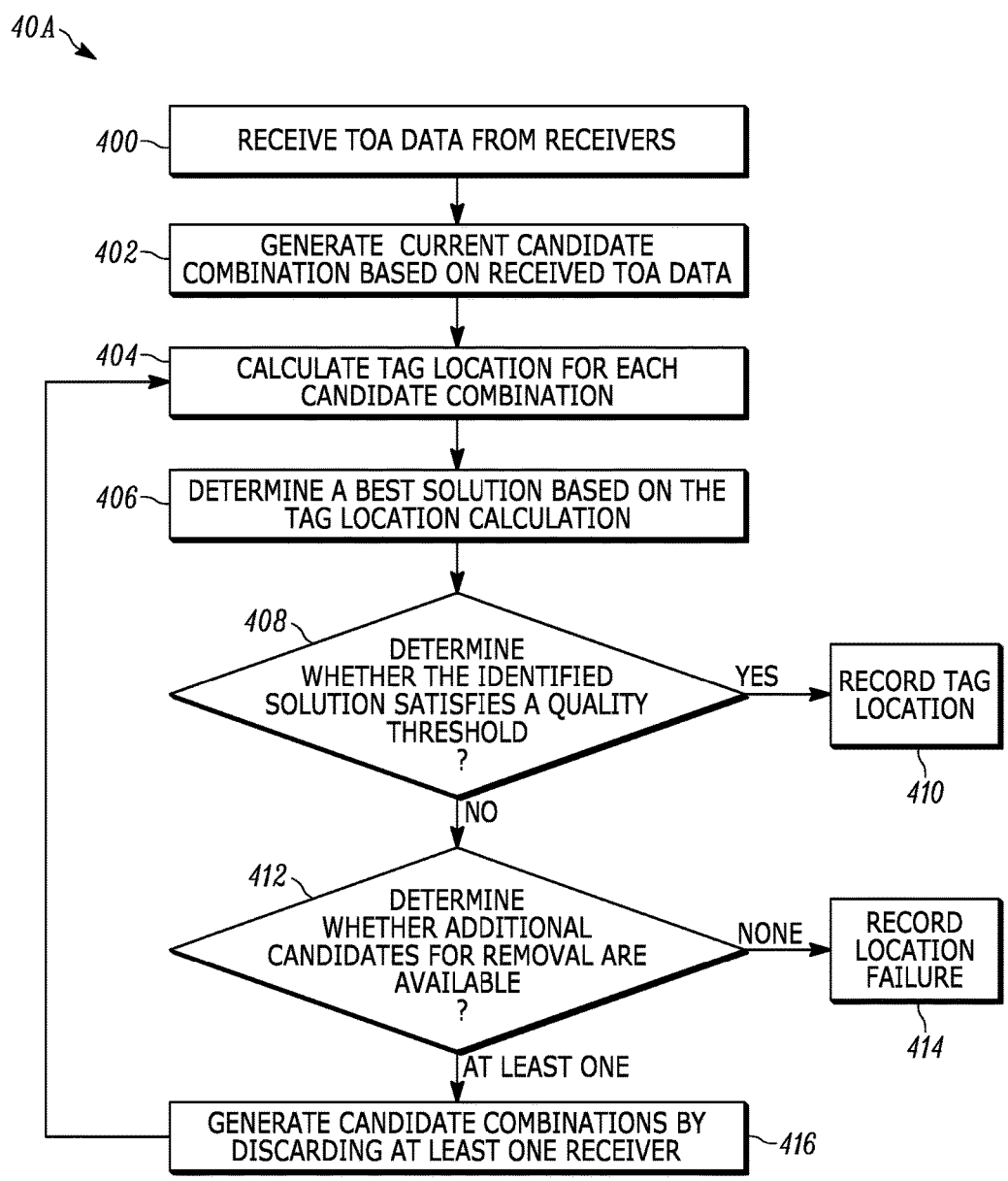
Figure 4B:
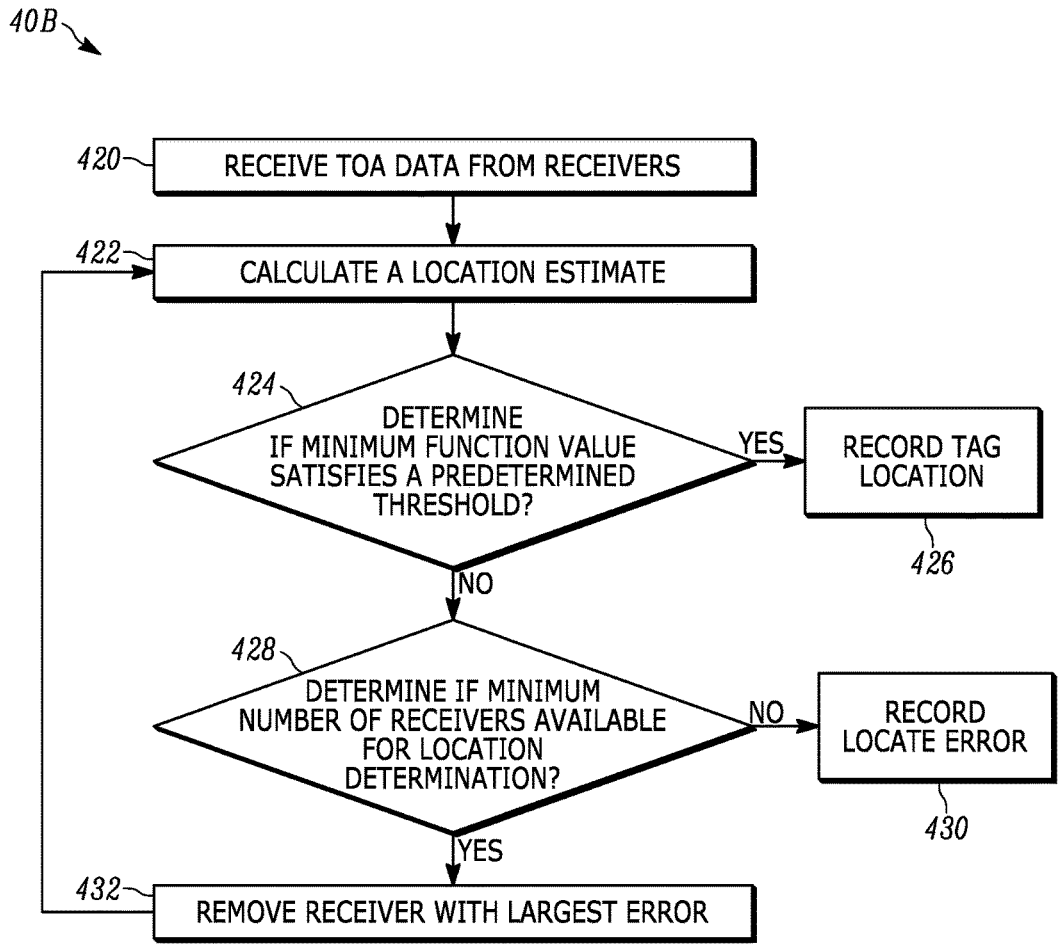
Figure 4C:
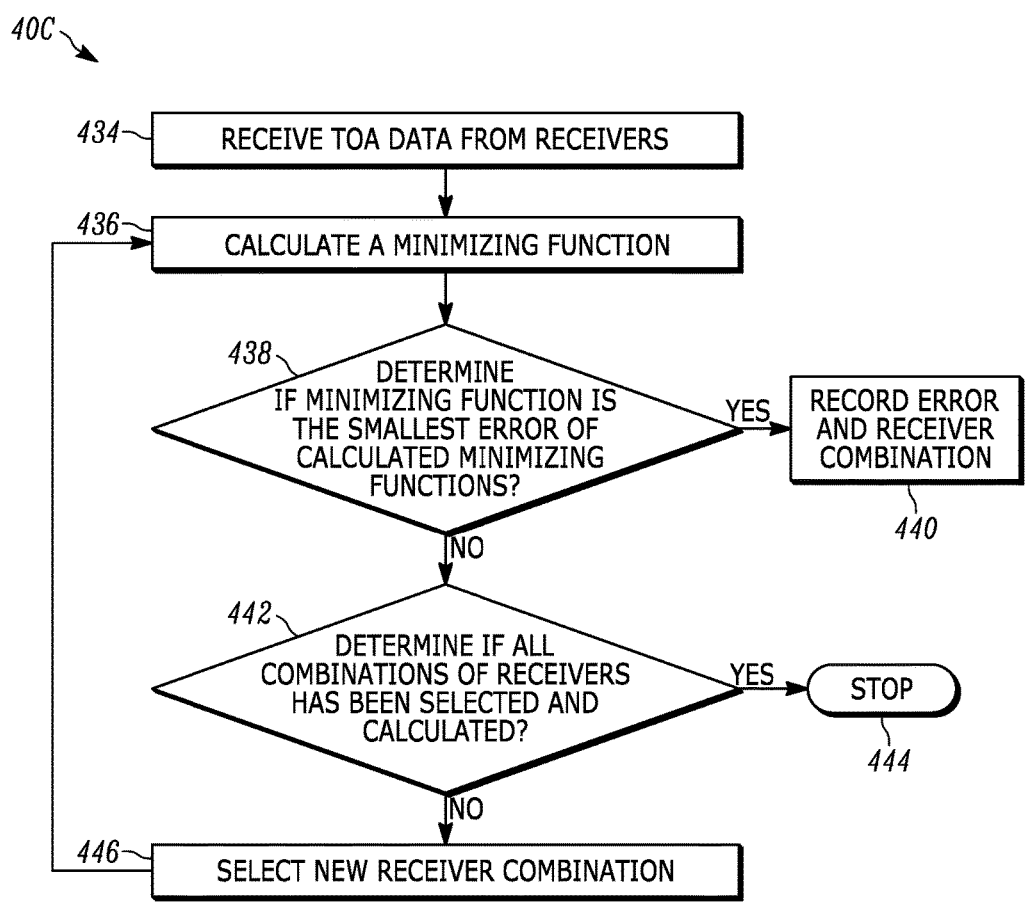
Figure 5:
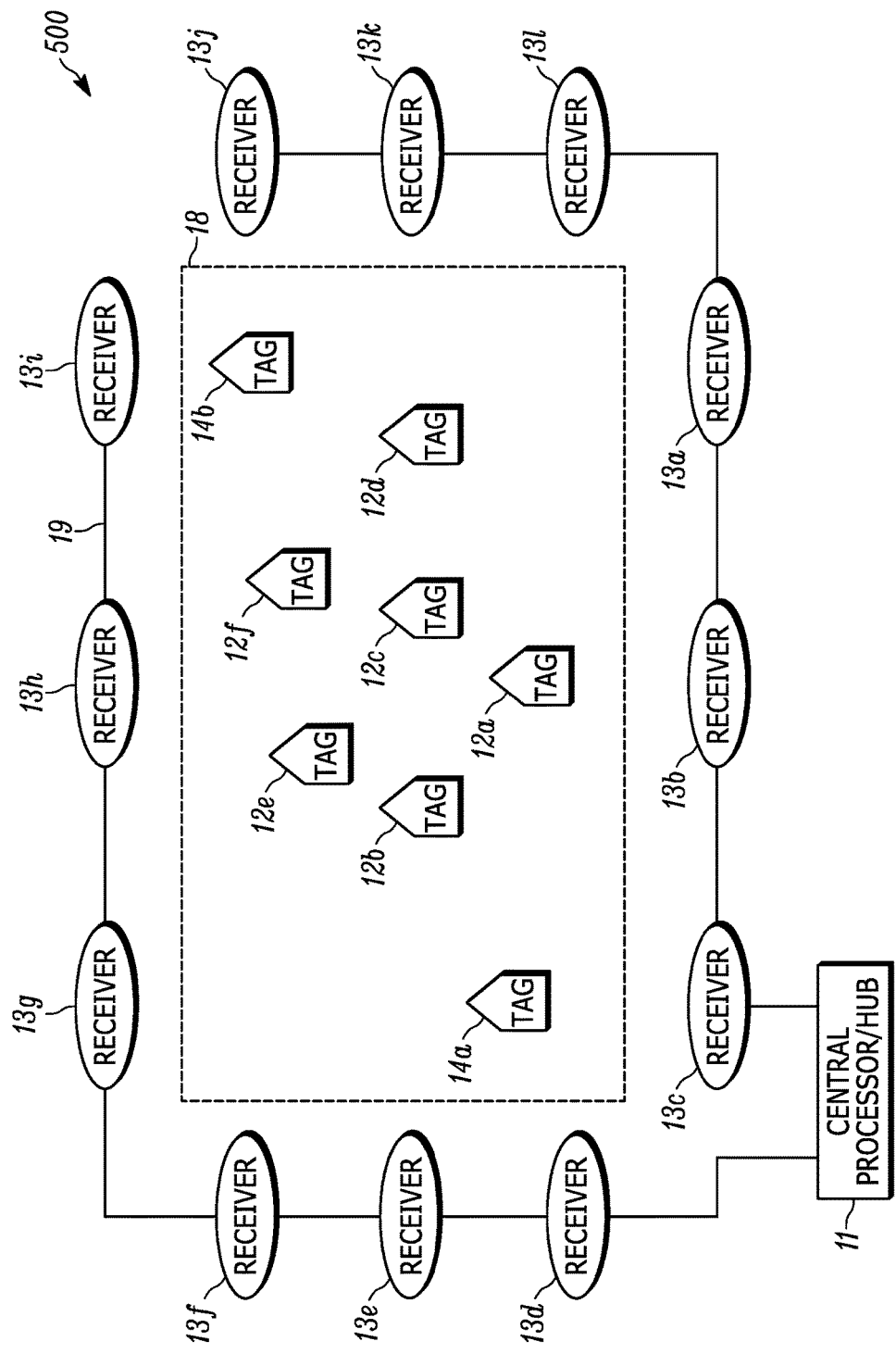
Figure 6:
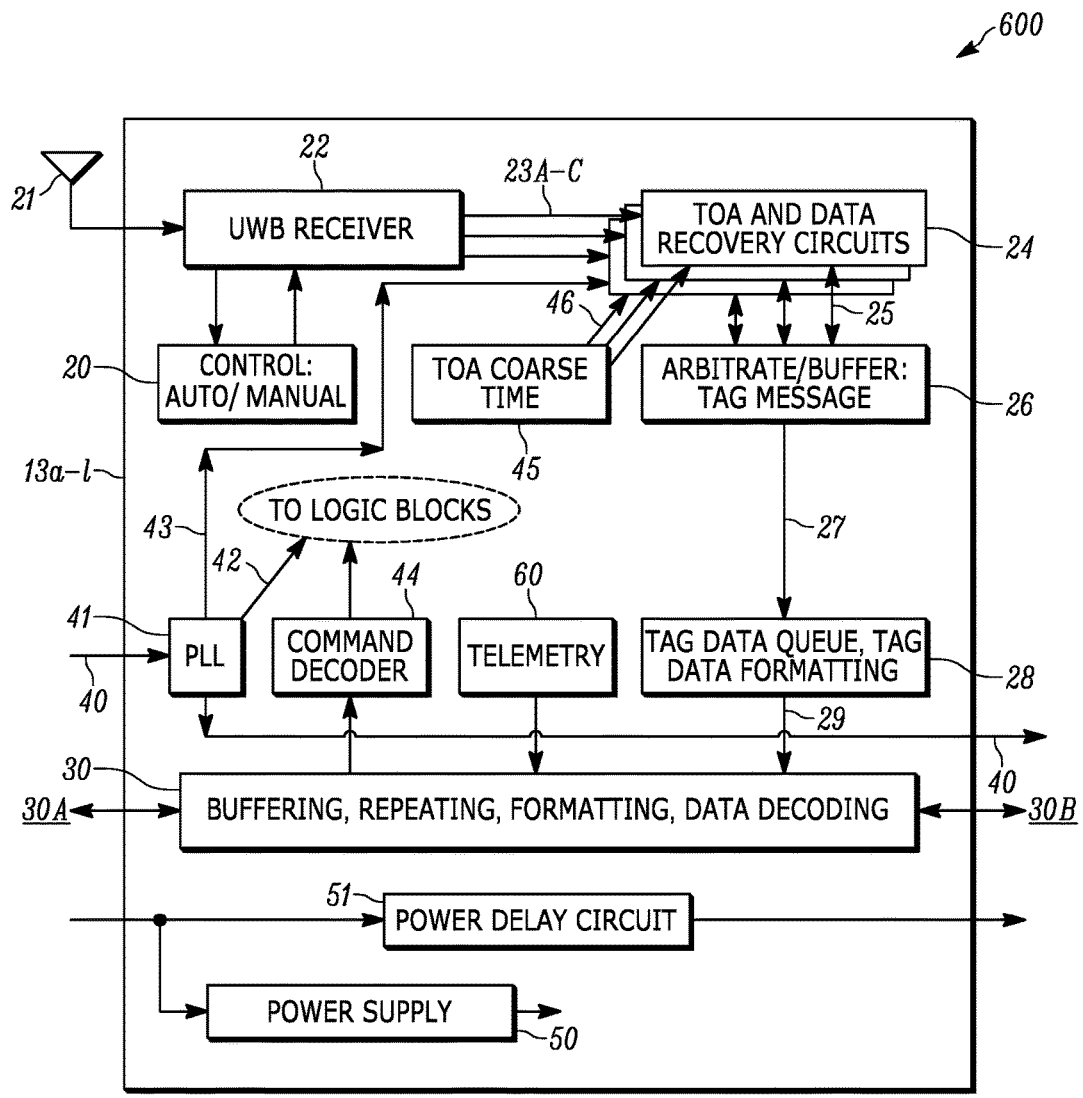
Figure 7:
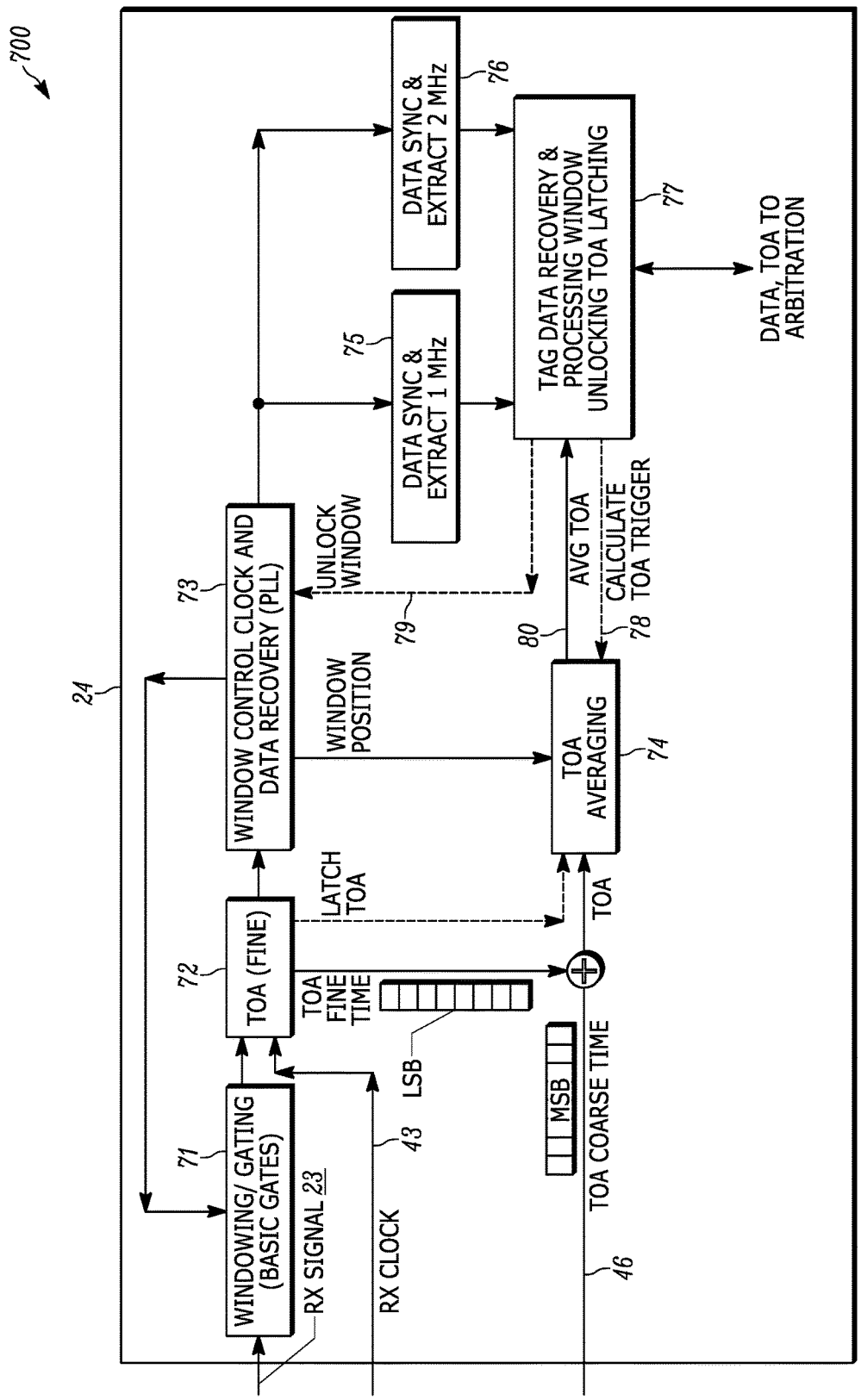

Having thus described the invention in general terms, reference will now be made to the accompanying drawings, which are not necessarily drawn to scale, and wherein:

FIG. 1 shows a timing diagram 100 for an RTLS tag transmission in an example high-resolution TOA determination system, in accordance with example embodiments of the present invention;

FIG. 2 shows a timing diagram 200 for an RTLS tag transmission in an example high-resolution TOA determination system, in accordance with example embodiments of the present invention;

FIG. 3A illustrates a two-dimensional graphical representation of an over-determined TOA target location method in a multiple receiver target location system, in accordance with example embodiments of the present invention;

FIG. 3B illustrates a two-dimensional graphical representation of a critically-determined TOA target location method in a multiple receiver target location system, in accordance with example embodiments of the present invention;

FIG. 3C illustrates a two-dimensional graphical representation of an over-determined TOA target location method comparing TOA errors in a multiple receiver target location system, in accordance with example embodiments of the present invention;

FIGS. 4A-4C illustrate flow charts showing example methods for an iterative recalculating of an RTLS tag transmitter location based on TOA measurements by the set of receivers in the receiver grid;

FIG. 5 illustrates an exemplary environment using a radio frequency locating system for providing performance analytics in accordance with some embodiments of the present invention;

FIG. 6 illustrates an exemplary receiver in a RTLS system comprising a RTLS receiver that may be configured in accordance with some embodiments of the present invention; and FIG. 7 illustrates an example TOA and recovery circuit function from the exemplary receiver in the RTLS system of FIG. 6, in accordance with some embodiments of the present invention.

DETAILED DESCRIPTION OF THE INVENTION

Example embodiments of the present invention now may be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

As such, example embodiments described herein comprise methods for an active Real Time Locating System (RTLS) tag target location system that provides for less than one-nanosecond (1 nsec) time of arrival (TOA) accuracy and resolution and significantly reduces the channel effects of multipath interference, even in low signal-to-noise ratio (SNR) applications. To accomplish these objectives, the example embodiments provide for an iterative and adaptive windowing function in one or more of the receivers of the receiver grid that captures multiple reflections of multiple transmissions from one or more of the associated target RTLS tags.

Example Method for Iterative Target Location in a Multiple Receiver to a System The present invention provides for an iterative recalculating of a target location estimate by successively testing receiver TOA error measurements and discarding outlier receivers. Embodiments of the present invention work to reduce the erratic effects that multipath channel interference and random noise play in target location systems due to incorrect identification of the main pulse of the transmit signal.

The TOA iterative location system of the present invention can be better appreciated with a cursory understanding of the corresponding TOA detection system. That is, it may be more clear why an errant TOA provided by one or more of the receivers 13a-1 in the receiver grid is removed from the RTLS location function performed at the Central Processor/Hub 11 when it is understood how the TOA measurement is made, and the types of errors that may result in a TOA error. To this end, the first two figures, FIG. 1 and FIG. 2, are presented as a primer to describe the pertinent details of the RTLS TOA detection and registration function for the present invention.

FIG. 1 shows a timing diagram 100 for an adjustable timing window function 220, in accordance with example embodiments of the present invention. FIG. 1 comprises timing diagrams associated with a transmitter (TX) clock 101, a receiver (RX) clock 201, and a time snippet of the RX clock 201, hereafter identified as RX' clock 202, that corresponds to an RX pulse 111R' receive event. The TX clock 101 provides for the timing relationship of a TX series of pulses 111T associated with a preamble 110, whereby the preamble 110 is an element of the RTLS tag transmission. The TX series of pulses 111T comprises a collection of individual, identical TX pulses 111T'. The TX clock 101 is resident at an example transmitter in the tag field.

The RX clock 201 provides for the timing relationship of an RX pulse train 211R, corresponding to the TX series of pulses 111T, whereby the RX pulse train 211R is itself comprised of the previously identified series of the RX pulses 111R', each corresponding to its respective TX pulse 111T' in the TX series of pulses 111T. The RX clock 201 is resident at an example receiver in the receiver grid. Each RX pulse 111R' comprises an RX pulse signature 212, representing one or more of an earliest pulse 215, a series of echoes 216A-B, and possible noise pulses 217, whereby the RX pulse signature 212 is associated with the RX' clock 202, as shown in FIG. 1, and is also associated with the corresponding TX pulse 111T'.

The adjustable timing window function 220, implemented at the receiver, provides for a capture and registration of the RX pulse signature 212 associated with the RX pulse 111R', shown in the RX' clock 202 timing diagram. The adjustable timing window function 220 is comprised of a series wide detection windows 221-230 and narrow detection windows 231-233, and an associated set of functions to adaptively position the series of wide and narrow detection windows 221-233 to center the RX pulse 111R' in the corresponding window. In some embodiments, as in the present example shown in FIG. 1, there are ten wide detection windows 221-230. In some embodiments, as in the present example shown in FIG. 1, there are three narrow detection windows 231-233. For notation convenience, the last window in the series of narrow detection windows 221-233 is called a final detector window 233.

In an example embodiment, as shown in FIG. 1, a first detection window 221 may be centered at 480 nsec, for example, with a width of 150 nsec. The center of the first detector window is a function of a first registered detection, wherein the present example registers a first registered detection at a second echo 216B of the RX pulse 111R'. The width of the first detection window 221 may be a function of an expected distance from the RTLS tag transmitter to the receiver.

The first detection window 221 may be adaptively updated by a second detection window 222 as provided by evidence of a second registered detection, wherein the present example registers a second registered detection at a first echo 216A of the RX pulse 111R'. In the example embodiment, the second detection window 222 may be centered at 460 nsec with a width of 150 nsec. Similarly, the second detection window 222 may be adaptively updated by a third detection window 223 as provided by evidence of a third registered detection, wherein the present example registers a third registered detection at the earliest pulse 215 of the RX pulse 111R'. In the example embodiment, the third detection window 223 may be centered at 415 nsec with a width of 150 nsec.

The series of wide detection windows 221-230 continue to be adaptively updated by the registered detections of RX pulses 111R' that comprise the RX pulse train 211R corresponding to the TX series of pulses 111T in the preamble 110. In some examples, a final wide detector window 230 may be declared after a detection of ten RX pulses 111R'. At which point a final wide detector window 230 is determined, the registered detections for the series of wide detection windows 221-230 ends, and the series of narrow detection windows 231-233 is implemented.

A first narrow detection window 231 may be centered at the center of the final wide detection window 230. The width of the first narrow detection window 231 is 30 nsec, in some examples. However, note that, as FIG. 1 demonstrates, a timing shift may result with the registered detection of the RX pulse 111R' associated with the first narrow detection window 231, and the first narrow detection window 231 may not be exactly centered. The placement of the first narrow detection window 231, in this example centered at 425 nsec, graphically represents such a shift, as the earliest pulse 215 associated with the RX pulse 111R' appears to be registered along the RX' clock 202 timing diagram closer to 415 nsec.

Each of the series of narrow detection windows 231-233 are comprised of three 10 nsec, disjoint timing windows 231A-C, 232A-C, and 233A-C. Detections for the RX pulses 111R' that comprise the RX pulse train 211R are registered in parallel in each of the three disjoint timing windows 231A-C, for example, to determine to which of the three disjoint timing windows 231A-C the detection should be assigned. The purpose of the series of narrow detection windows 231-233 is to ensure that the final detection associated with the final RX pulse 111R' in the RX pulse train 211R is registered in a final center disjoint timing window 233B associated with the final detector window 233. A slide narrow window function 235 to slide the series of narrow detection windows 231-233 left and right (235L, 235R) in 10 nsec increments, for example, is provided as a method to achieve the aforementioned requirement, and as such the final detection associated with the final RX pulse 111R' in the RX pulse train 211R is registered in the center of the final detector window 233, in the final center disjoint timing window 233B.

As implemented, the RX pulse 111R' detectors themselves may comprise several detectors and several functions that may effect an improvement in detection resolution. For example, the detectors may comprise several distinct detection levels or threshold levels that may be used to determine whether the magnitude of the earliest pulse 215, one or more of the echoes 216A-B, or a noise pulse 217 is in fact a signal, or just low-level background noise interference. As one possible TOA error, an echo 216A-B may be incorrectly identified as the earliest pulse 215. The TOA error may occur, for example, in a physical environment whereby the earliest pulse 215 is effectively blocked from reaching the receiver, but an echo 216A-B is registered as a detection. A scenario such as this may show an RX pulse 111R' registration in only one of the several TOA detectors, the detector corresponding to the lowest threshold level. FIG. 2 addresses the event of a TOA error that results from registering an echo 216A-B incorrectly as the earliest pulse 215.

FIG. 2 shows an example embodiment of a timing diagram 200, corresponding to the receiver 13e, for the adjustable window timing function 220, in accordance with example embodiments of the present invention. Example timing diagram 200 for receiver 13e (shown in FIG. 5), as with timing diagram 100 shown in FIG. 1, comprises timing diagrams associated with the TX clock 101, RX clock 201, and RX' clock 202, and the associated TX pulses and TX series of pulses 111T' and 111T, and RX pulse 211R' and RX pulse train 111R.

However, in this example shown in FIG. 2, the RX pulse signature 212, the earliest pulse 215, the series of echoes 216A-B, and the possible noise pulses 217, represents a physical environment whereby the second echo 216B is the strongest signal in the signature 212. As such, the adjustable timing window function 220, implemented at the receiver, provides for a capture and registration of the second echo 216B in the RX pulse signature 212, not the earliest pulse, as demonstrated previously for the adjustable window function 220 embodiment, shown in FIG. 1. As shown in FIG. 2, the slide narrow window function 235R slid the series of narrow detection windows 231-233 to the right in 10 nsec increments to capture the final detection associated with the final RX pulse 111R' in the RX pulse train 211R, whereby the final detection is registered in the center of the final detection window 233; that is, in the final center disjoint timing window 233B, centered at 485 msec.

In the event that a detection system functioning at receiver 13e, depicted in FIG. 5, fails to correctly identify the earliest pulse 215 from the RX pulse signature 212, as demonstrated in the present example, an incorrect TOA is reported to a first minimizing function resident at the Central Processor/Hub 11. An unknown TOA timing error $\delta t_e$, is associated with the TOA registered by the receiver 13e, whereby the TOA timing error is comprised of at least the aforementioned detection registration error, in this case the difference between the correct earliest pulse 215 TOA detection of approximately 414 nsec and the incorrect second echo 216B TOA detection, e.g. a late arrival, of approximately 482 nsec. As can appreciated, an uncorrected error of this magnitude, an error of approximately 68 feet for the TOA registered for receiver 13e in the present example, may corrupt the RTLS location function performed at the Central Processor/Hub 11.

Other error sources may include, but are not limited to, an asynchronous set of receiver 13a-1 clocks, whereby in the present example, the RX clock 202 is not correctly synchronized to the RX clocks in the other receivers 13a-1, as depicted in FIG. 5, used at the Central Processor/Hub 11 in the RTLS location function. However, for the most part, it is expected that the TOA error $\delta t_j$ associated with other error sources, such as an RX clock 202 synchronization, are small with respect to an incorrect identification of the earliest pulse 215, as shown in FIG. 2.

In some examples, the TOA detection and registration at receiver 13e, for example, may incorrectly identify the earliest pulse 215 intermittently. That is, the RTLS location function at the Central Processor/Hub 11 will alternately be sent a correct TOA, as in FIG. 1, and an incorrect TOA, as shown in FIG. 2, with an error of $\delta t_e$ for the TOA associated with receiver 13e. Left uncorrected, the RTLS location function at the Central Processor/Hub 11 will in turn alternately return from the first minimizing function, to be described in detail in the following section, a first location estimate $X_0, Y_0, Z_0$ that is expected to 'skip' or 'jump' back and forth between alternately changing first location estimates. The method of the present invention reduces or eliminates the erratic first location estimate $X_0, Y_0, Z_0$ behavior, in this example, associated with incorrect earliest pulse 215 detections, and consequently, incorrect TOA registrations.

FIG. 3A shows a two dimensional (2D) graphical representation of a TOA target location method in a multiple receiver target location system and an example embodiment of a method for an iterative recalculating of an active RFID tag transmitter target location based on TOA measurements by the set of receivers 311-314, which may be substantially similar to receivers 13a-1 of FIG. 5. It is understood in the present example shown in FIGS. 3A-3C that a terminology of circles is consistent with a 2D treatment and rendering of the aforementioned method, making FIGS. 3A-3C, for example, easier to track than a three dimensional (3D) rendering. Of course, moving from the present 2D example to a 3D example requires an associated unit increase in a minimum number of receivers 311-314 necessary for a location estimate in the RTLS system, both for a critically-determined and an over-determined estimate, to be described later.

A set of circles 300A, shown in FIG. 3A, represent the geometry of the TOA location system, relating distance and time. The respective radii 301, 302, 303, and 304 of the set of circles 300 represent subsequently determined time-of-flight (TOF) estimates for a set of receivers 311, 312, 313, and 314, corresponding to receivers 311-314, from the set of receivers 311-314 in the receiver grid, such as the receiver grid including receivers 13a-1 of FIG. 5, wherein the receivers 311-314 fixed physical locations are represented by crosses (+) at the circle centers for the set of circles 300A.

The radiuses of each circle may be interpreted as TOAs $t_1$, $t_2$, $t_3$, and $t_4$, relative to an estimated transmission time $t_0$, as measured by the receivers 311-314 receive clocks. The circles 300A each represent an RFID tag transmit time estimate of the unknown true target transmit time $t_0'$. Thereby, the TOF estimates $\Delta t_1$-$\Delta t_4$, which are equal to the differences between the TOAs $t_1$-$t_4$ and the first target tag transmit time estimate $t_0$, corresponding to the distances between the circle centers and the respective circles 300A, can be readily interpreted as the radii 301-304 associated with the receivers 311-314.

A final location estimate may be determined by iterative recalculation of a target location as discussed below in FIGS. 4A-4C.

FIG. 3B shows an example embodiment 300B of a method for an iterative recalculating of an RFID tag transmitter target location based on TOA measurements by the set of receivers 311-313 in the receiver grid, in accordance with example embodiments the present invention. FIG. 3B presents an enlarged, magnified view of the previously described intersection of circles 311-313; that is, the $n^{th}$ location estimate $X_n, Y_n, Z_n$, point 350', in which circles 311-313 are coincident.

FIG. 3C shows an example embodiment of a method for an iterative recalculating of a 2D RFID tag transmitter target location based on TOA measurements by the set of five receivers 311-315 in the receiver grid, now including the fifth receiver 315, identified as receiver 13e. As in FIG. 3A, the collection of circles 300C represent time-of-flight (TOF) estimates $\Delta t_1$-$\Delta t_4$ and $\Delta t_5$ for a set of receivers 311-315, in the receiver grid (not shown), wherein the receivers 311-314 and 315 fixed physical locations are represented by crosses (+) at the circle centers for the set of circles 300C.

The circle radii also each represent TOAs $t_1, t_2, t_3, t_4$, and $t_5$ relative to an RFID tag transmit time estimate, or first target time estimate $t_0$, an estimate of the unknown true target transmit time $t_0'$. The circles 300C themselves represent TOAs $t_1$-$t_4$ and $t_5$, as before, measured by the receivers 311-314 and 315 receiver clocks relative to an estimated target tag transmission time.

FIG. 4A illustrates a flow chart of a process 40A for an iterative recalculation of a target location in a multiple receiver target location system, in accordance with embodiments of the present invention.

At block 400, the Central Processor/Hub 11 may receive TOA data, such as TOA timestamps $t_1$-$t_n$ received from the receivers, such as from receivers 311-314, the received TOA data being measured by the respective receiver clocks. The circles 300C, shown in the example embodiment given in FIG. 3C, represent the TOAs $t_1$-$t_5$ as measured by the set of receivers 311-315 receiver clocks. A reception of a complete set of TOAs 400 (e.g., TOAs from receivers 311-315) at the Central Processor/Hub 11, as designated in FIG. 4A, represents an interrupt and/or start point for the process for the iterative recalculation of the target location by TOAs. In an example embodiment, the receiver clocks may be synchronized in frequency, but not necessarily in phase. As such, a set of receiver clock synchronization offsets $\Delta\Phi_n$ may be applied to each of the participating receivers, for example, receivers 311-315, in the RTLS TOA location estimate. The set of receiver clock synchronization offsets $\Delta\Phi_n$ may be garnered from a process involving an RX clock synchronization function for RX clocks 201, shown in FIGS. 1-2, and described in detail in the following sections referencing FIGS. 5-7, whereby a set of clock synchronization offsets ΔΦ$_n$ are applied to respective TOAs at receivers 311-315, for example, where each of the respective receiver clocks are offset with respect to a reference tag, as discussed in further detail in FIG. 5.

At block 402, a current candidate combination is generated based on the received TOA data, such as the TOA data received in block 400. In some examples, the current candidate combination consists of each receiver that provided TOA data. Alternatively or additionally, a subset of the receivers may make up the current candidate combination in an instance in which an error is detected or the like. For example, if the difference in arrival times from any two receivers represents a distance greater than the physical distance between the same two receivers, it can be determined that one of the receivers received a substantially delayed signal. That is, if:

$$c(t_j-t_i) > d_{ij} = \sqrt{(x_i-x_j)^2+(y_i-y_j)^2+(z_i-z_j)^2} \quad (1)$$

then timestamp $t_j$ can be discarded as being not from a direct signal.

At block 404, the RTLS target locations system may calculate tag locations based on the remaining received TOA data. The calculation of tag location is based on a minimizing function. The minimizing function is configured to calculate a location estimate (X, Y, Z) and the transmit time estimate $t_0$ for a candidate combination of receivers of a receiver grid of N receivers. The Z dimension is assumed fixed, in some examples, for two dimensional location determinations. The minimizing function is derived from the TOA errors for the receivers, where the individual TOA errors, are as described in Equation 2:

$$s_j = d_j - c(t_j - t_0) \quad (2)$$

where $s_j$ represents the TOA error for the jth receiver, and $d_j = \sqrt{(X-x_j)^2+(Y-y_j)^2+(Z-z_j)^2}$ is the distance from computed location (X, Y, Z) to receiver j, and $t_0$ is the computed transmission time. The computed location and transmission time, (X, Y, Z, $t_0$), are determined by minimizing the sum of squares of the TOA errors:

$$\min_{X,Y,Z,t_0}\{S = \Sigma_j s_j^2\} \quad (3)$$

where the summation is taken over TOA data from all receivers in the candidate combination.

There may be one or more candidate combinations of TOA data for which locations will be computed. In many cases, there will be one combination consisting of the entire set of remaining TOA data. In other cases, there may be several candidate combinations, each consisting of a subset of the remaining TOA data.

At block 406, the RTLS target location system determines a best solution from the one or more candidate combinations, based on results of their respective tag location calculations. This determination is based on the resulting data quality indicator, or DQI, values from each location calculation of each candidate TOA combination. When a minimum, $S_{min}$, is found, DQI is taken as the mean or per-receiver, value of $S_{min}$. Thus, DQI=$S_{min}$/N, where N is the total number of receivers participating in the candidate combination. The DQI value is a measure of agreement amongst the TOA measurements, and indicates the degree to which the TOA measurements correspond to direct line-of-sight propagation paths as opposed to paths from unknown and uncontrolled reflected signals. The DQI is derived as a result of the minimization process used to compute a location for a candidate set of TOA values.

If all TOA values are perfect and from direct paths, then DQI will be zero. Any non-zero value is an estimate of the deviation of the TOA measurements from perfect data and is an indication of the confidence of the computed location. The solution with the lowest DQI value from amongst the one or more candidate combinations may be used as the best solution at record tag location block 406.

At decision block 408, the RTLS target location system determines whether the solution identified, such as the solution determined at block 406, satisfies a quality threshold. This threshold is a configurable parameter which is used to determine the acceptability of a solution. If the DQI from the solution chosen in block 406 is below this threshold value, then that solution is taken as the overall solution, and the location computation for that tag transmission. Acceptance of the solution is indicated by block 410.

In an instance in which the threshold is not satisfied at decision block 408, indicating a larger than acceptable error value, then at decision block 412, the RTLS target location system determines whether additional candidates for removal are available (e.g., the system may require a sufficient number of receivers so as to be able generate a location estimate after one or more receivers are discarded). In some examples, the RTLS target location system may compare the number of receivers, such as the number of receivers in the current candidate combination, to a minimum receiver quantity threshold. In an example embodiment the minimum receiver quantity threshold may be a predetermined number of receivers. In some examples, such as a two-dimensional (2D) location estimate in a 2D RTLS system, the minimum receiver quantity threshold (number of TOAs and receivers) may be four. In another example, such as a three-dimensional (3D) location estimate in a 3D RTLS system, the minimum receiver quantity threshold (number of TOAs and receivers) may be five. Although a 2D RTLS location estimate may be determined based on three receivers and 3D RTLS location estimates may be determined based on four receivers, the additional receivers allows for an overdetermined location to be determined. The overdetermined location allows for the location estimate to be tested for agreement among the TOAs, as discussed herein. In some example embodiments, the minimum receiver quantity threshold may be a percentage of the available receivers, such as 25%, 50%, 75%, 90%, or any other percentage of available receivers. In an instance in which the minimum receiver quantity threshold is a percentage of available receivers, the percentage may be set at or above the minimum number of receivers for determining an overdetermined location.

In an instance in which the RTLS target location system determines that the minimum receiver quantity threshold is not satisfied at block 412, the method fails indicating that a location cannot be determined for a particular iteration. In an instance in which a location cannot be determined due to insufficient receiver TOAs, the RTLS target location system may record a locate error, or "fail" at block 414. In an instance in which the RTLS target location system determines that the minimum receiver quantity threshold is satisfied, then further refinement may be attempted at block 416.

At block 416, further elimination, or pruning, of the receiver TOA data can be performed. This pruning can be performed in an exhaustive manner by forming N candidate combinations out of the set of TOAs used in the previous best solution, each with one receiver TOA missing. Other combinations can be envisioned in which more than one receiver is removed to form candidate combinations. However, it is possible that exhaustive pruning can lead to the removal of legitimate, direct path TOA data in the pursuit of a lower DQI value. This simple method is unable to discriminate between TOAs from a direct or reflected path.

Preferably, some intelligence can be applied to the pruning process by evaluating the individual contributions to the minimized function, to determine the most likely receiver TOA or TOAs to have been resulting from a non-direct or reflected signal. There are several ways to perform this intelligent pruning. Some of these are based on a Taylor expansion of the minimization function, while maintaining minimization conditions, as one particular TOA is perturbed by an amount of $\delta t_j$. The incremental response to this change is a change in the four-dimensional quantity $(X, Y, Z, t_0)$ for any given solution.

Defining the four-space vector $\vec{R}=X\hat{x}+Y\hat{y}+Z\hat{z}+t_0\hat{z}_0$, to represent the position and transmit time of a minimized solution, $S(\vec{R})$, the second-order Taylor expansion of $S_{min}$ can be determined. In an instance in which a receiver's timestamp is perturbed by an amount $\delta t_j$, the minimization function may be altered. The perturbation may lead to a new position and time vector, $\vec{R}'=\vec{R}+\Delta\vec{R}$. A new minimization function S' may result from the perturbation. The new minimization function may be determined to second order in perturbed quantities:

$$S'(\vec{R}')=S|_{\vec{R}}+\Delta\vec{R}\cdot\nabla S|_{\vec{R}}+\tfrac{1}{2}\Delta\vec{R}\Delta\vec{R}:\nabla\nabla S|_{\vec{R}}-2(s_j|_{\vec{R}}+\Delta\vec{R}\cdot\nabla s_j|_{\vec{R}})(c\delta t_j)+(c\delta t_j)^2 \quad (4)$$

The change in position and time as a result of the perturbed timestamp may be the value of $\Delta\vec{R}$ which minimizes S'. $\Delta\vec{R}$ may be found from the gradient with respect to $\Delta\vec{R}$, giving the condition:

$$\bar{J}\cdot\Delta\vec{R}=2\nabla s_j|_{\vec{R}}c\delta t_j \quad (5)$$

Where $\bar{J}=\nabla\nabla S|_{\vec{R}}$ is the Jacobian of the gradient of S, evaluated at the unperturbed location $\vec{R}$. Putting the position change, $\Delta\vec{R}$, from Equation 5 into Equation 4 may yield the net effect on the minimization function of a change $\delta t_j$ in one TOA of the following:

$$S_{min}(\vec{R}+\Delta\vec{R})=(S_{min}(\vec{R})-2s_j(c\delta t_j)+\alpha_j(c\delta t_j)^2 \quad (6)$$

where the second order coefficient, $\alpha_j$, is derived from the inverse of the Jacobian matrix $\bar{J}$ of the gradient of $S(\vec{R})$:

$$\alpha_j=1-2(\hat{v}_j+\hat{t}_0)\cdot\bar{J}^{-1}\cdot(\hat{v}_j+\hat{t}_0) \quad (7)$$

$$\hat{v}_j=[(X-x_j)\hat{x}+(Y-y_j)\hat{y}+(Z-z_j)\hat{z}]/d_j \quad (8)$$

and:

$$\bar{J}=2\rho_i(\hat{v}_i+\hat{t}_0(\hat{v}_i+\hat{t}_0) \quad (9)$$

In a first-order method, the receiver with correspondingly most negative value of $s_j$ is a good candidate for removal, since the TOA from that receiver would reduce $S_{min}(\vec{R}+\Delta\vec{R})$, as shown in Equation (6), most quickly for a negative value of $\delta t_j$, as would be the case if it were the result of a delayed signal. This method works well in many cases.

A preferred method is to determine, according to the approximation of Equation (6), what value of $\delta t_j$ will cause the greatest reduction in $S_{min}(\vec{R}+\Delta\vec{R})$ for negative values, only, of $\delta t_j$. The second order approximation will exhibit a minimum at $\delta t_j=s_j/\alpha_j$, and a corresponding estimate of $S_{min}(\vec{R}+\Delta\vec{R})$ of $(S_{min}(\vec{R})-s_j^2/a_j)$. The receiver, j, with corresponding least value of $(S_{min}(\vec{R})-s_j^2/a_j)$, or, equivalently, greatest value of $(s_j^2/a_j)$, while having a negative value of $\delta t_j=s_j/a_j$ is a very good candidate for removal. This choice indicates the receiver TOA which is not only delayed, but were it not delayed would most significantly reduce the value of the minimization function.

Other methods of pruning, either exhaustive or intelligent, can be performed. For example, a higher-order Taylor expansion can be implemented to gain a more accurate estimate of signal delays responsible for unacceptable DQI values. In alternative or additional examples, multiple receivers may be removed at each iteration.

Following the removal of the one or more receivers at block 412, the process returns to block 404 with one or more candidate combinations. As described above, the method iterates until a threshold is satisfied at block 408 or the method fails by way of failing to satisfy a receiver quantity threshold at block 412.

FIG. 4B shows a flow chart summarizing a step-by-step process 40B that enables an example embodiment of the method for an iterative recalculation of a target location in a multiple receiver target location system, in accordance with the present invention. At block 420, TOAs $t_1 \ldots, t_n$ are received by the Central Processor/Hub in the multiple receiver RTLS target location system.

At block 422, a minimizing function is applied to the measured TOAs, such as TOAs $t_1, \ldots, t_n$. The TOA minimizing function is configured to calculate a first location estimate $(X_1, Y_1, Z_1)$ and the first target transmit time estimate $t_{01}$ for a receiver grid of n receivers. Using the first location estimate, the TOA minimizing function calculates the TOA errors $s_{kl}$ for the n receivers, where the TOA errors $s_{kl}$ are as described in Equation 12 for l=1.

$$s_{kl}=(\sqrt{(X_1-x_k)^2+(Y_1-y_k)^2+(Z_1-z_k)^2})-c(t_k-t_{01}) \quad (12)$$

Where: $s_{kl}$ represents the TOA error for the $k^{th}$ receiver during iteration 1

$x_k, y_k, z_k$ represents the location of the $k^{th}$ receiver $X_l, Y_l, Z_l$ represents the location estimate for the $l^{th}$ iteration $t_k$ represent the TOA at the $k^{th}$ receiver $t_{01}$ represents the transmit time estimate for the $l^{th}$ iteration c represents the speed of light, in vacuum.

In some example embodiments, the minimizing function comprises minimizing a sum of the squares of the TOA errors $s_{1l}, \ldots, s_{nl}$. In some example embodiments, the minimizing function comprises minimizing a root-mean-square (RMS) of the TOA errors $s_{1l}, \ldots, s_{nl}$. The minimizing function comprising minimizing the sum of squares for example is given in Equation 13.

$$S_l=\min_{X_lY_lZ_lt_{01}}\Sigma_{k=1}^{N_l}s_{kl}^2 \quad (13)$$

$$\sigma_l^2=S_l/N_l \quad (14)$$

Where: $S_l$ represents the minimizing function value for the $l^{th}$ iteration.

$\sigma_l$ represents the standard deviation of the TOA errors for the $l^{th}$ iteration.

$N_l$ represents the number of receivers providing data for the $l^{th}$ iteration.

Alternatively or additionally, and in an example embodiment, the TOA minimizing function may be repeated and the TOA errors $s_{kl}$ may be recalculated for estimated locations and transmit times proximate the first estimated locations and first estimated transmit time, until a minimum value is returned for the minimizing function value $S_1$. In such examples, the best first location estimate $(X_1, Y_1, Z_1)$ and the best first target transmit time estimate $t_{o1}$ are determined, along with the TOA errors $s_{k1}$ associated with each of the n receivers.

At decision block 424, the RTLS target location system determines if the minimum function value $S_1$ or $\sigma_1$ satisfies a predetermined threshold value. That is, if the first minimizing function value $\sigma_1$ is less than a predetermined or programmable threshold value indicating an acceptable error value, sometimes called a DQI value, then the first minimizing function value $S_1$ is determined acceptable and the location estimate $(X_1, Y_1, Z_1)$ and the target time transmit estimate $t_{o1}$ are recorded. In an instance in which the threshold is satisfied, the method ends after the location estimate $(X_1, Y_1, Z_1)$ and the target time transmit estimate $t_{o1}$ are recorded as is shown in block 426.

In an instance in which the minimizing function value $S_1$ is greater than the predetermined or programmable threshold value at block 424, indicating a larger than acceptable error value, then at block 428, the RTLS target location system determines whether a minimum number of receivers are available for a location determination (e.g., the system as a sufficient number of receivers so as to be able generate a location estimate or overdetermined location estimate). In some examples, the RTLS target location system may compare the number of receivers to a minimum threshold. In some examples, such as a two-dimensional (2D) position estimate in a 2D RTLS system, the minimum threshold (number of TOAs and receivers) may be four. In another example, such as a three-dimensional (3D) position estimate in a 3D RTLS system, the minimum threshold (number of TOAs and receivers) may be 5.

In an instance in which the RTLS target location system determines that the minimum threshold is not satisfied then, at block 430, the method fails indicating that a location cannot be determined. In an instance in which a location cannot be determined due to insufficient receiver TOAs, the RTLS target location system may record a locate error, or "fail".

In an instance in which the RTLS target location system determines that the minimum threshold is satisfied then, at block 432, the RTLS target system removes a receiver with the largest TOA error value as determined in equation 12, e.g. the receiver which would have the largest effect on $S_1$ if removed to correct the error (late TOA). Specifically, in some examples the RTLS target location system may remove a receiver from the set of n receivers, wherein the receiver that is removed is associated with the maximum TOA error $s_{kl}$ from the set of n TOA errors $s_{1l}, \ldots s_{nl}$, as given in Equation 15.

$$\text{IF: } S_{kl} > \gamma_1 \sqrt{\Sigma S_{kl}^2 / N_1} = \gamma_1 \sigma_l \quad (15)$$

THEN: Discard the $k^{th}$ receiver.

Where: $S_{kl}$ represent the TOA error for the $k^{th}$ receiver for iteration 1.
$\sigma_l$ represents the standard deviation of the TOA errors for iteration 1.
$N_l$ represents the number of receivers participating in iteration 1
$\gamma_l$ represents a scalar multiplier.

In an example embodiment, $\gamma_1$ may be a fixed scalar multiplier; alternatively, $\gamma_1$ may change dynamically. Following the removal of the receiver related to the maximum TOA error $s_{kl}$ from the set of n TOA errors $s_{1l}, \ldots, s_{nl}$ at step 432, the process 40B returns to step 422.

FIG. 4C shows a flow chart summarizing a step-by-step process 40C that enables an example embodiment of the method for an iterative recalculation of a target location in a multiple receiver target location system, in accordance with the present invention. The step-by-step process 40C represents an iterative recalculation of a target location for an RTLS target location system.

At block 434, TOAs $t_1, \ldots, t_5$ are received by the Central Processor/Hub in the multiple receiver RTLS target location system. At block 436, the RTLS target location system may calculate a minimizing function value $S_k$ using a TOA minimizing function, such as the TOA minimizing function described above with respect to FIG. 4B.

At decision block 438, the RTLS target locations system may test the minimizing function value error, $S_k$ calculated by the TOA minimizing function at step 436, against all previously calculated error values. In an instance in which the minimizing function value error is $S_k$ the smallest error when compared to other error calculations, the receiver combination and the minimum function value error $S_k$ is recorded in step 440.

At block 442, the RTLS target location system may determine if all m combinations of receivers has been selected and calculated, e.g. if a receiver combination threshold has been satisfied. In an instance in which all respective combination of receivers has been selected and a position estimate $(X_k, Y_k, Z_k)$ and a set of TOA errors $S_k$ associated with each of the m sets of receiver combinations has been calculated, the process 40C is completed at step 444 with the position estimate being selected based on the combination of receivers, k* that had the smallest error calculation as determined in block 438.

In an instance in which the RTLS target location system has not calculated a position estimate $(X_k, Y_k, Z_k)$ and a set of TOA errors $S_k$ associated with each of the m sets of receiver combinations, then, at block 446, a new combination of n or fewer TOAs from the associated original receiver set is selected in a $(n,K)^{th}$ permutation. In an example embodiment, the RTLS target location system may remove and replace receivers TOAs iteratively until each of the m receiver combinations has been calculated. The process may continue at step 436.

In some examples, an advantage of process 40B in FIG. 4B is minimal processing time and processing power requirements. Additionally, 40B is more likely to discriminate late arrival TOAs. In other examples, an advantage of process 40C in FIG. 4C is a more complete analysis of possible TOA combinations, resulting in, predictably, a better, more accurate RTLS location estimate. $(X_{k*}, Y_{k*}, Z_{k*})$.

At this point, it is important to draw the distinction between a critically-determined RTLS location system and an over-determined RTLS location system. For the 2D example presented in FIG. 3A, the independent variables estimated for the first minimizing function, given in Equations 10-11, are the first location estimate $(X_1, Y_1, Z_1)$ and the first target transmit time estimate $t_{o1}$. In 2D, the first location estimate is represented by the coordinates $(X_1, Y_1, Z_1)$, and combined with the first target transmit time $t_{o1}$, provides for three independent variables.

As such, a collection of three TOA constraints from the three receivers 13a-c, for example, critically determines the dependent TOA errors $s_1, \ldots, s_3$. That is, represented graphically, the three circles 311-313 from the set of circles 300 intersect at a point, whereby the circles 311-313 represent the first target location estimate, as previously noted, the radii 301-303 represent the TOFs $\Delta t1$-$\Delta t3$, and the resulting TOA errors $s_1, \ldots, s_3$ are each zero.

As such, a collection of three TOA constraints from the three receivers 13a-c, for example, critically determines the dependent TOA errors $s_1, \ldots, s_3$. Represented graphically, the three circles 311-313 from the set of circles 300 intersect at a point, whereby the circles 311-313 represent the first target location estimate, as previously noted, the radii 301-303 represent the TOFs $\Delta t_1$-$\Delta t_3$, and the resulting TOA errors $s_1, \ldots, s_3$ are each zero.

FIG. 3B graphically represents an example step in the iteration of the minimizing function, given in equations 12-14, wherein the independent variables (X, Y, Z) and $t_0$ are converging such that the first minimizing function value S is approaching zero; that is, that each of the TOA errors $s_1, \ldots, s_3$ are simultaneously converging to zero, as discussed in the previous section. In the example presented in FIG. 3B, the three TOA errors are equal to each other, and the final location estimate (X, Y, Z), the point 350', it follows, has already converged.

As can be appreciated, provided with three TOAs $t_1$-$t_3$ from three receivers 311-313, FIG. 3B graphically represents a critically-determined 2D RTLS location system. FIG. 3A, on the other hand, provides for four TOAs $t_1$-$t_4$ from four receivers 311-314, and as such FIG. 3A graphically represents an over-determined 2D RTLS location system.

Returning to FIG. 3A, it can be appreciated that the method for comparing TOA errors $s_1, \ldots, s_4$, as defined in Equation 2, wherein the four receivers 311-314 in FIG. 3A provide for an over-determined RTLS location system, does not work. The reason: removing any one of the four receivers 311-314 from the 2D RTLS location system yields a critically-determined system, wherein each first minimizing function value $s_k$ is zero.

That is, each location estimate (X, Y, Z) and associated first target transmit time estimate $t_0$ from each combination of three receivers from the set of four receivers 311-314 is equally valid. As such, to conduct a test for comparing TOA error, as described in Equation 15, there must be at least five TOAs $t_1$-$t_5$ generated from five receivers 311-315 for the 2D RTLS location system.

Also, it can be appreciated that where the foregoing descriptions and arguments have been made and are applicable to a 2D RTLS location system, the descriptions and arguments apply equally to a 3D RTLS location system, whereby the number of TOAs and receivers associated with a critically-determined system, an over-determined systems, and the minimum requirements for implementation of a method for comparing TOA errors $s_1, \ldots, s_4$, given in Equation 15, are each increased by one. That is, for a 3D RTLS location system, a critically-determined system requires four TOAs, and over-determined system requires at least five TOAs, and minimum requirements for implementation of a method for comparing TOA errors $s_1, \ldots, s_5$, given in Equation 15, is six TOAs and six receivers 311-316.

In the example presented graphically in FIG. 3C, the first minimizing function may now produce a first location estimate $(X_1, Y_1, Z_1)$ 350", in accordance with Equations 12-14. Implementation of a method for comparing TOA errors $s_1, \ldots, s_5$, given in Equation 115, may determine that the TOA error $s_5$ is significantly larger than the TOA errors $s_1, \ldots, s_4$, that TOA $t_5$ associated with the receiver 315 (13e) is an outlier, and should be discarded.

In such case, the example embodiment of the method for an iterative recalculating of a 2D RFID tag transmitter target location based on TOA measurements is rerun with the remaining set of four receivers 311-314 in the receiver grid, as depicted in FIG. 3A. In a second iteration, Equations 12-15 provide form identical functions as the first iteration, searching the space-time regime now for a second location estimate $X_2, Y_2, Z_2$ and a second target transmit time $t_2$ to find the second minimizing function value $\delta T_2$ for minimizing the second minimizing function in Equations 12-14.

As with the first location estimate $(X_1, Y_1, Z_1)$, the second location estimate $(X_2, Y_2, Z_2)$ is made by minimizing a second minimizing function value $S_2$ from a second minimizing function, wherein the second minimizing function comprises a set of distance or timing errors, TOA errors $s_1, \ldots, s_4$ between TOF estimates $\Delta t_1$-$\Delta t_4$ and the distance from the circle centers to the second location estimate $(X_2, Y_2, Z_2)$.

In some embodiments, the second minimizing function comprises minimizing a sum of the squares of the TOA errors $s_1, \ldots, s_4$. In some embodiments, the second minimizing function comprises minimizing an RMS of the TOA errors $s_1, \ldots, s_4$. The second minimizing function comprising minimizing the sum of squares and the second minimizing function comprising minimizing the RMS map directly onto Equations 12-14, respectively, presented previously for FIG. 3A.

As shown previously in FIG. 3A, the present invention addresses the TOA measurement errors in the set of receivers 311-315 in the receiver grid, shown in FIG. 3C, and presents a method for iteratively recalculating the second minimizing function to significantly improve the second location estimate $(X_2, Y_2, Z_2)$ over and above the first location estimate $(X_1, Y_1, Z_1)$ discarding TOA errors that are outliers. The method for comparing the TOA errors, $s_1, \ldots s_4$ following completion of the second minimizing function, maps directly onto the method for comparing the TOA errors $s_1, \ldots, s_4$, given in Equation 15, presented previously in conjunction with the first minimizing function and FIG. 3A.

The method for iteratively recalculating the second minimizing function, in accordance with the geometry associated with FIG. 3A, allows for a second scalar multiplier $\gamma_2$ to be introduced into the second minimizing function. In one embodiment, $\gamma_2$ may be a fixed scalar multiplier. In one embodiment, $\gamma_2$ may change dynamically. In one embodiment, $\gamma_2$ may be a fixed scalar multiplier, but have a different value from $\gamma_1$.

In some embodiments, the iterative recalculating of $(X_1, Y_1, Z_1)$ and $t_{0l}$ may continue for a prescribed number of iterations. In some embodiments, the iterative recalculating of $(X_1, Y_1, Z_1)$ and $t_{0l}$ may continue until such point that no further TOA errors $s_{kl}$, and no additional associated receivers, such as the receiver 315 (13e) in the example from FIG. 3C, are discarded, in accordance with the $l^{th}$ minimizing function. A final location estimate $(X_m, Y_m, Z_m)$ resulting from a final iterative recalculating for target location—specifically, the final result in accordance with the $m^{th}$ minimizing function—represents the final target location estimate for the RTLS TOA target location system, in this example, whereby the final target location estimate for the geometry presented in FIG. 3A, is denoted by point 350.

For the example shown iteratively in FIG. 3C, then FIG. 3A, the second location estimate $(X_2, Y_2, Z_2)$ may provide for a smaller value for the second minimizing function value $\sigma_2$ for the second minimizing function; that is, $\sigma_2 < \sigma_1$. The smaller second minimizing function value $\sigma_2$ for the second minimizing function may represent an improvement in the accuracy of the second location estimate $(X_2, Y_2, Z_2)$ over the first location estimate $(X_0, Y_0, Z_0)$. The potential improvement in accuracy represented by the second location estimate $(X_2, Y_2, Z_2)$ may be a direct effect of the absence of the TOA error $t_5$, the absence of the receiver 315 (13e) from FIG. 3C, from the second minimization function. If so, it may be that erratic effects associated with target location in the TOA target location system may be attributed to the receiver 315 from FIG. 3C, and further may be a direct result of a multipath channel associated with the receiver 315 or a random noise received at the receiver 315.

Example Real Time Locating System

FIG. 5 illustrates an exemplary locating system 500 useful for calculating a location by an accumulation of location data or time of arrivals (TOAs) at a central processor/hub 11, whereby the TOAs represent a relative time of flight (TOF) from RTLS tags 12a-f as recorded at each receiver 13a-1 (e.g., UWB reader, etc.). A timing reference clock is used, in some examples, such that at least a subset of the receivers 13a-1 may be synchronized in frequency, whereby the relative TOA data associated with each of the RTLS tags 12a-f may be registered by a counter associated with at least a subset of the receivers 13a-1. In some examples, a reference tag 14a-b, preferably a UWB transmitter, positioned at known coordinates, is used to determine a phase offset between the counters associated with at least a subset of the of the receivers 13a-1. The RTLS tags 12a-f and the reference tags 14a-b reside in an active RTLS field 18. The systems described herein may be referred to as either "multilateration" or "geolocation" systems, terms that refer to the process of locating a signal source by solving an error minimization function of a location estimate determined by the difference in time of arrival (DTOA) between TOA signals received at multiple receivers 13a-1.

In some examples, the system comprising at least the tags 12a-f and the receivers 13a-1 is configured to provide two dimensional and/or three dimensional precision localization (e.g., subfoot resolutions), even in the presence of multipath interference, due in part to the use of short nanosecond duration pulses whose TOF can be accurately determined using detection circuitry, such as in the receivers 13a-1, which can trigger on the leading edge of a received waveform. In some examples, this short pulse characteristic allows necessary data to be conveyed by the system at a higher peak power, but lower average power levels, than a wireless system configured for high data rate communications, yet still operate within local regulatory requirements.

In some examples, to provide a preferred performance level while complying with the overlap of regulatory restrictions (e.g., FCC and ETSI regulations), the tags 12a-f may operate with an instantaneous −3 dB bandwidth of approximately 400 MHz and an average transmission below 187 pulses in a 1 msec interval, provided that the packet rate is sufficiently low. In such examples, the predicted maximum range of the system, operating with a center frequency of 6.55 GHz, is roughly 200 meters in instances in which a 12 dbi directional antenna is used at the receiver, but the projected range will depend, in other examples, upon receiver antenna gain. Alternatively or additionally, the range of the system allows for one or more tags 12a-f to be detected with one or more receivers positioned throughout a football stadium used in a professional football context. Such a configuration advantageously satisfies constraints applied by regulatory bodies related to peak and average power densities (e.g., effective isotropic radiated power density ("EIRP")), while still optimizing system performance related to range and interference. In further examples, tag transmissions with a −3 dB bandwidth of approximately 400 MHz yields, in some examples, an instantaneous pulse width of roughly 2 nanoseconds that enables a location resolution to better than 30 centimeters.

Referring again to FIG. 5, the object to be located has an attached tag 12a-f, preferably a tag having a UWB transmitter, that transmits a burst (e.g., multiple pulses at a 1 Mb/s burst rate, such as 112 bits of On-Off keying (OOK) at a rate of 1 Mb/s), and optionally, a burst comprising an information packet utilizing OOK that may include, but is not limited to, ID information, a sequential burst count or other desired information for object or personnel identification, inventory control, etc. In some examples, the sequential burst count (e.g., a packet sequence number) from each tag 12a-f may be advantageously provided in order to permit, at a Central Processor/Hub 11, correlation of TOA measurement data from various receivers 13a-1.

In some examples, the tag 12a-f may employ UWB waveforms (e.g., low data rate waveforms) to achieve extremely fine resolution because of their extremely short pulse (i.e., sub-nanosecond to nanosecond, such as a 2 nsec (1 nsec up and 1 nsec down)) durations. As such, the information packet may be of a short length (e.g. 112 bits of OOK at a rate of 1 Mb/sec, in some example embodiments), that advantageously enables a higher packet rate. If each information packet is unique, a higher packet rate results in a higher data rate; if each information packet is transmitted repeatedly, the higher packet rate results in a higher packet repetition rate. In some examples, higher packet repetition rate (e.g., 12 Hz) and/or higher data rates (e.g., 1 Mb/sec, 2 Mb/sec or the like) for each tag may result in larger datasets for filtering to achieve a more accurate location estimate. Alternatively or additionally, in some examples, the shorter length of the information packets, in conjunction with other packet rate, data rates and other system requirements, may also result in a longer battery life (e.g., 7 years battery life at a transmission rate of 1 Hz with a 300 mAh cell, in some present embodiments).

Tag signals may be received at a receiver directly from RTLS tags, or may be received after being reflected en route. Reflected signals travel a longer path from the RTLS tag to the receiver than would a direct signal, and are thus received later than the corresponding direct signal. This delay is known as an echo delay or multipath delay. If reflected signals are sufficiently strong enough to be detected by the receiver, they can corrupt a data transmission through inter-symbol interference. In some examples, the tag 12a-f may employ UWB waveforms to achieve extremely fine resolution because of their extremely short pulse (e.g., 2 nsec) durations. Furthermore, signals may comprise short information packets (e.g., 112 bits of OOK) at a somewhat high burst data rate (1 Mb/sec, in some example embodiments), that advantageously enable packet durations to be brief (e.g., 112 usec) while allowing inter-pulse times (e.g., 998 nsec) sufficiently longer than expected echo delays, avoiding data corruption Reflected signals can be expected to become weaker as delay increases due more reflections and to the longer distances traveled. Thus, beyond some value of inter-pulse time (e.g., 998 nsec), corresponding to some path length difference (e.g., 299.4 m.), there will be no advantage to further increases in inter-pulse time (and, hence lowering of burst data rate) for any given level of transmit power. In this manner, minimization of packet duration allows the battery life of a tag to be maximized, since its digital circuitry need only be active for a brief time. It will be understood that different environments can have different expected echo delays, so that different burst data rates and, hence, packet durations, may be appropriate in different situations depending on the environment.

Minimization of the packet duration also allows a tag to transmit more packets in a given time period, although in practice, regulatory average EIRP limits may often provide an overriding constraint. However, brief packet duration also reduces the likelihood of packets from multiple tags overlapping in time, causing a data collision. Thus, minimal packet duration allows multiple tags to transmit a higher aggregate number of packets per second, allowing for the largest number of tags to be tracked, or a given number of tags to be tracked at the highest rate.

In one non-limiting example, a data packet length of 112 bits (e.g., OOK encoded), transmitted at a data rate of 1 Mb/sec (1 MHz), may be implemented with a transmit tag repetition rate of 1 transmission per second (1 TX/sec). Such an implementation may accommodate a battery life of up to seven years, wherein the battery itself may be, for example, a compact, 3-volt coin cell of the series no. BR2335 (Rayovac), with a battery charge rating of 300 mAhr. An alternate implementation may be a generic compact, 3-volt coin cell, series no. CR2032, with a battery charge rating of 220 mAhr, whereby the latter generic coin cell, as can be appreciated, may provide for a shorter battery life.

Alternatively or additionally, some applications may require higher transmit tag repetition rates to track a dynamic environment. In some examples, the transmit tag repetition rate may be 12 transmissions per second (12 TX/sec). In such applications, it can be further appreciated that the battery life may be shorter.

The high burst data transmission rate (e.g., 1 MHz), coupled with the short data packet length (e.g., 112 bits) and the relatively low repetition rates (e.g., 1 TX/sec), provide for two distinct advantages in some examples: (1) a greater number of tags may transmit independently from the field of tags with a lower collision probability, and/or (2) each independent tag transmit power may be increased, with proper consideration given to a battery life constraint, such that a total energy for a single data packet is less that an regulated average power for a given time interval (e.g., a 1 msec time interval for an FCC regulated transmission).

Alternatively or additionally, additional sensor or telemetry data may be transmitted from the tag 12a-f to provide the receivers 13a-1 with information about the environment and/or operating conditions of the tag. For example, the tag may transmit a temperature to the receivers 13a-1. Such information may be valuable, for example, in a system involving perishable goods or other refrigerant requirements. In this example embodiment, the temperature may be transmitted by the tag at a lower repetition rate than that of the rest of the data packet. For example, the temperature may be transmitted from the tag to the receivers at a rate of one time per minute (e.g., 1 TX/min.), or in some examples, once every 720 times the data packet is transmitted, whereby the data packet in this example is transmitted at an example rate of 12 TX/sec.

Alternatively or additionally, the tag 12a-f may be programmed to intermittently transmit data to the receivers 13a-1 in response to a signal from a magnetic command transmitter (not shown). The magnetic command transmitter may be a portable device, functioning to transmit a 125 kHz signal, in some example embodiments, with a range of approximately 15 feet or less, to one or more of the tags 12a-f. In some examples, the tags 12a-f may be equipped with at least a receiver tuned to the magnetic command transmitter transmit frequency (e.g., 125 kHz) and functional antenna to facilitate reception and decoding of the signal transmitted by the magnetic command transmitter.

In some examples, one or more other tags, such as a reference tag 14a-b, may be positioned within and/or about a monitored region. In some examples, the reference tag 14a-b may be configured to transmit a signal that is used to measure the relative phase (e.g., the count of free-running counters) of non-resettable counters within the receivers 13a-1.

One or more (e.g., preferably four or more) receivers 13a-1 are also positioned at predetermined coordinates within and/or around the monitored region. In some examples, the receivers 13a-1 may be connected in a "daisy chain" 19 fashion to advantageously allow for a large number of receivers 13a-1 to be interconnected over a significant monitored region in order to reduce and simplify cabling, provide power, and/or the like. Each of the receivers 13a-1 includes a receiver for receiving transmissions, such as UWB transmissions, and preferably, a packet decoding circuit that extracts a time of arrival (TOA) timing pulse train, transmitter ID, packet number, and/or other information that may have been encoded in the tag transmission signal (e.g., material description, personnel information, etc.) and is configured to sense signals transmitted by the tags 12a-f and one or more reference tags 14a-b.

Each receiver 13a-1 includes a time measuring circuit that measures times of arrival (TOA) of tag bursts, with respect to its internal counter. The time measuring circuit is phase-locked (e.g., phase differences do not change and therefore respective frequencies are identical) with a common digital reference clock signal distributed via cable connection from a Central Processor/Hub 11 having a central timing reference clock generator. The reference clock signal establishes a common timing reference for the receivers 13a-1. Thus, multiple time measuring circuits of the respective receivers 13a-1 are synchronized in frequency, but not necessarily in phase. While there typically may be a phase offset between any given pair of receivers in the receivers 13a-1, the phase offset is readily determined through use of a reference tag 14a-b. Alternatively or additionally, each receiver may be synchronized wirelessly via virtual synchronization without a dedicated physical timing channel.

In some example embodiments, the receivers 13a-1 are configured to determine various attributes of the received signal. Since measurements are determined at each receiver 13a-1, in a digital format, rather than analog in some examples, signals are transmittable to the Central Processor/Hub 11. Advantageously, because packet data and measurement results can be transferred at high speeds to a receiver memory, the receivers 13a-1 can receive and process tag (and corresponding object) locating signals on a nearly continuous basis. As such, in some examples, the receiver memory allows for a high burst rate of tag events (i.e., information packets) to be captured.

Data cables or wireless transmissions may convey measurement data from the receivers 13a-1 to the Central Processor/Hub 11 (e.g., the data cables may enable a transfer speed of 2 Mbps). In some examples, measurement data is transferred to the Central Processor/Hub at regular polling intervals.

As such, the Central Processor/Hub 11 determines or otherwise computes tag location (i.e., object location) by processing TOA measurements relative to multiple data packets detected by the receivers 13a-1. In some example embodiments, the Central Processor/Hub 11 may be configured to resolve the coordinates of a tag using nonlinear optimization techniques.

In some examples, TOA measurements from multiple receivers 13a-1 are processed by the Central Processor/Hub 11 to determine a location of the transmit tag 12a-f by a differential time-of-arrival (DTOA) analysis of the multiple TOAs. The DTOA analysis includes a determination of tag transmit time $t_0$, whereby a time-of-flight (TOF), measured as the time elapsed from the estimated tag transmit time $t_0$ to the respective TOA, represents graphically the radii of spheres centered at respective receivers 13a-1. The distance between the surfaces of the respective spheres to the estimated location coordinates $(X_0, Y_0, Z_0)$ of the transmit tag 12a-f represents the measurement error for each respective TOA, and the minimization of the sum of the squares of the TOA measurement errors from each receiver participating in the DTOA location estimate provides for both the location coordinates $(X_0, Y_0, Z_0)$ of the transmit tag and of that tag's transmit time $t_0$.

In some examples, the system described herein may be referred to as an "over-specified" or "over-determined" system. As such, the Central Processor/Hub 11 may calculate one or more valid (i.e., most correct) locations based on a set of measurements and/or one or more incorrect (i.e., less correct) locations. For example, a location may be calculated that is impossible due the laws of physics or may be an outlier when compared to other calculated locations. As such one or more algorithms or heuristics may be applied to minimize such error.

The starting point for the minimization may be obtained by first doing an area search on a coarse grid of x, y and z over an area defined by the user and followed by a localized steepest descent search. The starting position for this algorithm is fixed, in some examples, at the mean position of all active receivers. No initial area search is needed, and optimization proceeds through the use of a Davidon-Fletcher-Powell (DFP) quasi-Newton algorithm in some examples. In other examples, a steepest descent algorithm may be used.

One such algorithm for error minimization, which may be referred to as a time error minimization algorithm, may be described in Equation 16:

$$S = \sum_{j=1}^{N} \left[ [(x-x_j)^2 + (y-y_j)^2 + (z-z_j)^2]^{\frac{1}{2}} - c(t_j - t_0) \right]^2 \quad (16)$$

Where N is the number of receivers, c is the speed of light, $X_j, Y_j, Z_j$ are the coordinates of the $j^{th}$ receiver, $t_j$ is the arrival time at the jth receiver, and $t_0$ is the tag transmit time. The variable $t_0$ represents the time of transmission. Since $t_0$ is not initially known, the arrival times, $t_j$, as well as $t_0$, are related to a common time base, which in some examples, is derived from the arrival times. As a result, differences between the various arrival times have significance for determining location as well as $t_0$.

The optimization algorithm to minimize the error S in Equation 16 may be the Davidon-Fletcher-Powell (DFP) quasi-Newton algorithm, for example. In some examples, the optimization algorithm to minimize the error S in Equation 13 may be a steepest descent algorithm. In each case, the algorithms may be seeded with an initial location estimate (X, Y, Z) that represents the two-dimensional (2D) or three-dimensional (3D) mean of the positions of the receivers 13a-1 that participate in the RTLS location determination.

In some examples, the RTLS system comprises a receiver grid, whereby each of the receivers 13a-1 in the receiver grid keeps a receiver clock that is synchronized, with an initially unknown phase offset, to the other receiver clocks. The phase offset between any receivers may be determined by use of a reference tag that is positioned at a known coordinate position $(X_T, Y_T, Z_T)$. The phase offset serves to resolve the constant offset between counters within the various receivers 13a-1, as described below.

In further example embodiments, a number N of receivers 13a-1 $\{Rj:j=1, \ldots, N\}$ are positioned at known coordinates $(X_{R_j}, Y_{R_j}, Z_{R_j})$, which are respectively located at distances $d_{R_j}$ from a reference tag 14a-b, such as given in Equation 17:

$$d_{R_j} = \sqrt{(X_{R_j}-X_T)^2 + (Y_{R_j}-Y_T)^2 + (Z_{R_j}-Z_T)^2} \quad (17)$$

Each receiver Rj utilizes, for example, a synchronous clock signal derived from a common frequency time base, such as a clock generator. Because the receivers are not synchronously reset, an unknown, but constant offset Oj exists for each receiver's internal free running counter. The value of the constant offset Oj is measured in terms of the number of fine resolution count increments (e.g., a number of nanoseconds for a one nanosecond resolution system).

The reference tag is used, in some examples, to calibrate the radio frequency locating system as follows: The reference tag emits a signal burst at an unknown time TR. Upon receiving the signal burst from the reference tag, a count $N_{R_j}$ as measured at receiver Rj is given in Equation 18 by:

$$N_{R_j} = \beta \tau_R + \beta d_{R_j}/c \quad (18)$$

Where c is the speed of light and $\beta$ is the number of fine resolution count increments per unit time (e.g., one per nanosecond). Similarly, each object tag $T_i$ of each object to be located transmits a signal at an unknown time $\tau_i$ to produce a count $N_{ij}$, as given in Equation 19:

$$N_{ij} = \beta \tau_i + O_j + \beta d_{ij}/c \quad (19)$$

At receiver Rj where $d_{ij}$ is the distance between the object tag $T_i$ and the receiver 13a-1 Rj. Note that $\tau_i$ is unknown, but has the same constant value for all receivers Rj. Based on the equalities expressed above for receivers Rj and Rk and given the reference tag 14a-b information, phase offsets expressed as differential count values are determined as given in Equations 20 and 21:

$$N_{R_j} - N_{R_k} = (O_j - O_k) + \beta \left( \frac{d_{R_j}}{c} - \frac{d_{R_k}}{c} \right) \quad (20)$$

Or, $$(O_j - O_k) = (N_{R_j} - N_{R_k}) - \beta \left( \frac{d_{R_j}}{c} - \frac{d_{R_k}}{c} \right) = \Delta_{jk} \quad (21)$$

Where $\Delta_{jk}$ is constant as long as $d_{R_j} - d_{R_k}$ remains constant, (which means the receivers and reference tag are fixed and there is no multipath situation) and $\beta$ is the same for each receiver. Note that $\Delta_{jk}$ is a known quantity, since $N_{R_j}, N_{R_k}, \beta$, $d_{R_j}/c$, and $d_{R_k}/c$ are known. That is, the phase offsets between receivers Rj and Rk may be readily determined based on the reference tag 14a-b transmissions. Thus, again from the above equations, for a tag 12a-f (Ti) transmission arriving at receivers Rj and Rk, one may deduce the following Equations 22 and 23:

$$N_{ij} - N_{ik} = (O_j - O_k) + \beta \left( \frac{d_{R_j}}{c} - \frac{d_{R_k}}{c} \right) = \Delta_{jk} + \beta \left( \frac{d_{R_j}}{c} - \frac{d_{R_k}}{c} \right) \quad (22)$$

Or, $$d_{ij} - d_{ik} = (c/\beta)[N_{ij} - N_{ik} - \Delta_{jk}] \quad (23)$$

Each arrival time, $t_j$, can be referenced to a particular receiver (receiver "1") as given in Equation 24:

$$t_j = \frac{1}{\beta}(N_j - \Delta_{j1}) \qquad (24)$$

The minimization, described in Equation 13, may then be performed over variables (X, Y, Z, $t_0$) to reach a solution (X', Y', Z', $t_0$').

Example Receiver Architecure

FIG. 6 illustrates an exemplary receiver 13a-1 in a UWB receiver system 600 comprising a UWB receiver that may be configured in accordance with some embodiments of the present invention. In an example embodiment, data packets are transmitted to the receivers 13a-1 and intercepted by UWB antenna 21. A UWB receiver 22 is provided at each receiver 13a-1. The UWB receiver can, for example, be designed in accordance with the system described in commonly-owned U.S. Pat. No. 5,901,172, which is incorporated by reference herein in its entirety.

UWB receiver 22, provided for at receivers 13a-1, allows for an analog signal stream that is digitized, then processed by a UWB TOA and data recovery circuits 24. The analog stream is digitized by up to three or more parallel, concurrent, independent analog-to-digital convertors (ADCs) functioning with three distinct threshold levels, resulting in up to three or more digital data streams 23A-C that are sent to the UWB TOA and data recovery circuits 24. In some embodiments, the threshold levels applied to the analog signal stream in the UWB receiver 22 are a function of a signal-to-noise ratio (SNR) present in the communication channel. In some embodiments, the threshold levels are set dynamically as a function of one or more of an antenna preamp gain and an estimated RTLS tag range.

The UWB TOA and data recovery circuits 24 perform as many as three or more parallel, concurrent, identical signal processing functions on the three or more digital data streams 23A-C. The three or more UWB TOA and data recovery circuits 24 may be configured to receive data packets that correspond to RTLS tags 12a-f. The UWB TOA and data recovery circuits 24 may provide for a packet framing and extraction function as part of the data recovery circuit, whereby an RTLS tag 12a-f identification may be extracted. The RTLS identification may be extracted by the TX identification field 120B of the data packet, as described previously. In some embodiments, the UWB TOA and data recovery circuits 24 are implemented by field programmable gate arrays (FPGAs). The TOA and extracted data packet is sent by TOA line 25 to an arbitrate/buffer function 26.

The arbitrate/buffer function 26 effectively selects the TOA line 25 data provided by the UWB TOA and data recovery circuits 24. The arbitrate/buffer function 26 selects the TOA line 25 that converges to the earliest TOA from the up to three or more TOA and data recovery circuits 24 driven by the digital data stream 23A-C. The arbitrate/buffer function 26 provides for a series of serial messages, or tag message 27, to send to a tag queue function 28, whereby each of the tag messages 27 is identified by an RTLS tag 12a-f and an associated TOA.

The tag queue function 28 provides for a formatting and ordering of the collection of RTLS tag identifiers and TOAs, effectively a first-in first-out (FIFO) memory buffer awaiting a transmission to the central processor/hub 11. Upon a tag queue function 28 trigger, a tag data packet 29 is sent to a formatting and data coding/decoding function 30 that, in turn, repackages the tag data packet 29 and transmits a synchronous tag data packet 30B to the central processor/hub 11.

The synchronous tag data packet 30B transmitted by the formatting and data coding/decoding function 30 to the central processor/hub 11 is synchronized by a 10 MHz receiver clock 40, received from the previous receiver clock in the "daisy chain" 19, and transmitted to the next receiver clock in the "daisy chain" 19 following a synchronous frequency up/down convert. The receiver clock 40 drives a phase-locked loop (PLL) 41, whereby a frequency divider in a feedback loop in conjunction with a voltage-controlled oscillator (VCO) provides for a 100 MHz receiver clock 42-43 that is synchronized in phase to the 10 MHz receiver clock 40. The 100 MHz receiver clock 42 is provided to synchronize all logic blocks in the UWB receiver 13a-1 and to provide for a TOA coarse time 45, sent by line 46 to the TOA and data recovery circuits 24 to be used in the TOA determination. The 100 MHz receiver clock 43 provides for the parallel set of fine detector windows 340, a basis of a set of receiver timing windows used to capture and register pulses transmitted by RTLS tags 12a-f in the TOA determination, as described previously with respect to FIG. 3.

A second function of the formatting and data coding/decoding function 30 is a buffering, reformatting, and repeating of a central processor data 30A-B received and transmitted between the receiver 13a-1 and the central processor/hub 11 via the "daisy chain" 19 receiver network. The central processor data 30A-B received and transmitted from and to the formatting and data coding/decoding function 30 may provide for a series of commands that are decoded at a command decoder 44 to trigger receiver functions. A non-exhaustive list of such functions may include the following: an auto/manual control function 20, a series of telemetry functions 60, and the arbitrate/buffer function 26 to prune a data queue and to manage, delete, and reorder the data queue. The auto/manual control function 20 may be commanded—from manual mode—to report sensor information such as temperature and other telemetry data recorded in the telemetry function 60, and may be commanded to manually adjust one or more of an antenna preamp gain and the previously described threshold levels at the UWB receiver 22.

A power supply 50 may be configured to power the receiver 13a-1 by way of an AC-DC convertor, whereby the AC power may be provided as an input from the central processor/hub 11, shown in FIG. 5. The power supply 50 may be accompanied, in some embodiments, by a power delay circuit 51 to allow for an orderly 'power up' of sequential receivers 13a-1, thus avoiding a power surge and over-current event in the central processor data 30A-B transmission lines.

An advantage, in some examples, to the present embodiment of the UWB receiver system 600 is that packet data and measurement results can be transferred at high speeds to TOA measurement buffers, the arbitrate/buffer function 26, such that the receivers 13a-1 can receive and process tag 12a-f (and corresponding object) locating signals on a nearly continuous basis. That is, multiple UWB data packets can be processed in close succession, thereby allowing the use of hundreds to thousands of tag transmitters.

In some embodiments, data stored in TOA measurement buffers, the arbitrate/buffer function 26, is sent to a central processor/hub 11, shown in FIG. 5, over the central processor data transmission lines 30A-B in response to a specific request from the central processor/hub 11.

In some embodiments, the collection of the central processor data 30A-B transmission lines, connecting a "daisy chain" 19 network of receivers, is comprised of two bi-directional data links. In some embodiments, these data links may be RS422 differential serial links. A network interface may receive command signals from a central processor/hub 11 on one link, for example, to instruct a transfer of the TOA measurement buffer, the arbitrate/buffer function 26, to the central processor/hub 11. Additional commands may include those to adjust UWB receiver 22 operating characteristics such as gain and detection thresholds. The bi-directional data links may also provide for a buffer for data signals linked between "daisy chain" 19 receivers, buffering sequential transmissions between the present and next receiver 13a-1 in a communications chain.

The synchronous frequency up/down convert performed on the 10 MHz receiver clock 40 provides for a driver for the receiver clock 40 transmitted to the next receiver in the "daisy chain" 19. An advantage of this approach, in some examples, is that the 10 MHz receiver clock 40 transmitted to the next receiver-as with the original 10 MHz receiver clock 40—may be made low enough in frequency so that it can be transmitted over low-cost cables (e.g., twisted pair wires). Since timing jitter of the local timing reference signal degrades as the PLL multiplier coefficient is increased, there is a necessary trade-off between frequency and jitter of the local timing reference signal and the frequency of the timing reference clock.

Utilizing a common 10 MHz receiver clock 40 for timing reference, a plurality of local timing reference signals (one in each receiver) can be precisely matched in frequency. Using this approach, additional receivers can be connected without concern for clock loading. Buffer delay is also not an issue since the timing reference clock is used for frequency only, and not phase reference.

In some embodiments, the 10 MHz receiver clock 40 may comprise differential signals. The use of differential clock signals is advantageous since they avoid clock duty cycle distortion which can occur with the transmission of relatively high-speed clocks (e.g., >10 MHz) on long cables (e.g., >100 feet).

FIG. 7 illustrates an exemplary embodiment of the UWB TOA and data recovery circuits 700, presented in the UWB receiver system 600 as TOA and data recovery circuits 24, shown in FIG. 6, in accordance with some embodiments of the present invention. In an example embodiment, the UWB TOA data and recovery circuits 700 comprise a windowing/gating function 71, a TOA function 72, a window control clock and data recovery (PLL) function 73, a TOA averaging function 74, a data sync and extract function (1 MHz-2 MHz) 75-76, and a tag data recovery and processing function 77. The UWB TOA and data recovery circuits 700 process the digital data stream 23, shown in FIG. 6, to provide an unpacked data packet and the TOA associated with the RTLS tag to the arbitrate/buffer function 26.

The windowing/gating function 71 and the window control clock and data recovery (PLL) function 73 work as a feedback loop to recover the TX clock 101 and provide for the adjustable timing window functions 100 and 200, as presented in FIGS. 1-2, by tracking the RX pulses 111R' that comprise the RX pulse train 211R corresponding to the TX pulses 111T' in the series of TX pulses 111 in the preamble 110. The TOA function 72 works in conjunction with the 100 MHz receiver clocks 42-43. The RX clock 42 (201) provides for the TOA coarse time 46. The parallel set of fine detector windows 43 provides for a TOA fine time associated with an RX fine timing window function, recording detections by a registration code for the RX pulses 111R' that correspond to a sync code of TX pulses 111T'. The description for the adjustable timing window functions 100 and 200 are given with the presentation of FIGS. 1-2.

The TOA fine time, the disjoint timing windows 233A-C, as determined by the adjustable timing window functions 100 and 200, and the coarse time 46 are sent to the TOA averaging function 74, along with a latch TOA control signal indicating the end of a TOA determination. The TOA averaging function 74 is activated by a calculate TOA trigger 78, whereby a sub-window resolution function is initiated to determine the TOA with sub-window accuracy; that is, with resolution less than 1 nsec. The averaged TOA 80 is then sent to the tag data recovery and processing function 77.

The data sync and extract functions (1 MHz-2 MHz) 75-76 are triggered upon phase lock of the PLL associated with the window control clock and data recovery (PLL) function 73. Phase lock of the PLL is determined by the previously described feedback loop comprising the windowing/gating function 71 and the window control clock and data recovery (PLL) function 73, whereby the feedback loop effectively recovers the TX clock 101 by tracking the RX pulses 111R' corresponding to the preamble 110.

Upon phase lock, whereby the preamble 110 is synchronized to a recovered TX clock, the data packet, beginning with the remainder of the preamble 110, is extracted and unpacked by the data sync and extract function 75 (76) at a sampling rate of 1 Mhz (2 MHz), and sent to the tag data recovery and processing function 77. In another embodiment, the data sync and extract functions 75-76 are both set to sample the data packet with a sampling rate of 2 MHz, but the two functions may differ by a data format. In one example, the data extracted by function 75 may follow a non-IOS format, where the data extracted by function 76 may follow an IOS format.

The tag data recovery and processing function 77 serves as a data processor for the data extracted by the data sync and extract functions 75-76 and as a communications control function, and also provides for data exchange associated with the arbitrate/buffer function 26, shown in FIG. 6. The data tag recovery and processing function 77 sends the TOA and data packet information from the TOA averaging function 74 and the data sync and extract functions 75, 76, respectively, on TOA line 25 to the arbitrate/buffer function 26, which reformats and repacks selects the earliest TOA from the three TOA functions running concurrently in the UWB TOA and data recovery circuits 700, and combines the TOA with the data packet data into a tag message 27 to send to the tag data queue 28. At this point, the tag message 27 comprises at least the average TOA 80 and a TX ID extracted from the data packet associated with the given tag transmission. The tag data queue 28, as described previously with respect to FIG. 6, effectively functions as a FIFO buffer for data transmission to the central processor/hub 11.

The tag data recovery and processing function 77 also serves as a controller for the timing of a triggering of the TOA averaging function 74 and a locking/unlocking 79 of the PLL in the window control clock and data recovery (PLL) function 73. The TOA averaging function 74 is initiated by the calculate TOA trigger 78 set by the tag data memory and processing controller 77, whereby the TOA trigger 78 is a function of a sync code 112 detection and a waiting interval associated with the data sync and extract function 75-76. The locking/unlocking 79 of the PLL is a function of a PLL lock indication initiated at the window control clock and data recovery (PLL) function 73, as described previously. And the locking/unlocking 79 of the PLL is reset to unlock the PLL upon detection in the sync and data extract functions 75-76 that the end of the data packet has been reached, that the sampling of the data packet for the given tag transmission is complete.

The TOA averaging function 74 is initiated by the calculate TOA trigger 78. The TOA averaging function 74 may, in some examples, register a transition as successive RX pulses 111R' exhibit a change in a detection registration. In another example, a TOA numerical average may be constructed to assign a TOA with sub-window resolution. A TOA numerical average may be constructed, whereby RX pulses 111R' 1-5, for example, are assigned a weight equal to a 4 nsec time difference referenced to the leading edge of the final center disjoint timing window 233B, and whereby RX pulses 111R' 6-8 are assigned a weight equal to a 3 nsec time difference referenced to the leading edge of the final center disjoint timing window 233B. As such, a TOA average is calculated as: 410 nsec+($\frac{5}{8}$×14 nsec)+($\frac{3}{8}$×nsec)=414 $\frac{5}{8}$ nsec.

Exemplary embodiments of the present invention have been described herein. The invention is not limited to these examples. These examples are presented herein for purposes of illustration, and not limitation. Alternatives (including equivalents, extensions, variations, deviations, etc., of those described herein) may be apparent to persons skilled in the relevant art(s) based on the teachings contained herein. Such alternatives fall within the scope and spirit of the invention.

All publications, patents, and patent applications mentioned in this specification are herein incorporated by reference to the same extent as if each individual publication, patent, or patent application was specifically and individually indicated to be incorporated by reference.

That which is claimed:

1. A method for determining target location in a multiple receiver target location system, the multiple receiver target location system including a plurality of location tags each associated with a respective target, a plurality of receivers, and a central processor, the method comprising:
    receiving, from the receivers, time of arrival (TOA) data associated with location tag transmissions;
    determining a set of the receivers based on the received TOA data;
    calculating a tag location estimate for the set of the receivers by applying a minimizing function to a subset of the TOA data corresponding to the set of the receivers;
    determining a data quality indicator (DQI) for the tag location estimate; and
    when the DQI for the tag location estimate does not meet a DQI threshold:
        determining, for the subset of the TOA data, impacts of respective delays on the minimizing function;
        removing, based on the impacts of the respective delays, one of the receivers from the set of the receivers; and
        after removing the one of the receivers, recalculating the tag location estimate for the set of the receivers.

2. The method of claim 1 further comprising:
    determining a DQI for the recalculated tag location estimate; and
    determining whether the DQI for the recalculated tag location estimate meets the DQI threshold.

3. The method of claim 1, wherein the removing the one of the receivers from the set of the receivers and the recalculating the tag location estimate are performed iteratively.

4. The method of claim 1 further comprising, when the DQI for the tag location estimate meets the DQI threshold, outputting the tag location estimate.

5. The method of claim 1, further comprising determining whether the set of the receivers includes a predetermined number of receivers prior to removing one of the receivers from the set of the receivers.

6. The method of claim 1, further comprising determining whether the set of the receivers includes a predetermined percentage of the receivers of a receiver grid prior to removing one of the receivers from the set of the receivers.

7. The method of claim 1, wherein determining the impacts of respective delays on the minimizing function comprises:
    determining respective reductions in a value of the minimizing function for the delays; and
    identifying a greatest one of the reductions in the value.

8. A computer program product comprising at least one non-transitory computer-readable storage medium having computer-executable program code portions stored therein, the computer-executable program code portions comprising program code instructions configured to:
    receive, from a plurality of receivers, time of arrival (TOA) data associated with location tag transmissions;
    determine a set of the receivers based on the received TOA data;
    calculate a tag location estimate for the set of the receivers by applying a minimizing function to a subset of the TOA data corresponding to the set of the receivers;
    determine a data quality indicator (DQI) for the tag location estimate; and
    when the DQI for the tag location estimate does not meet a DQI threshold:
        determine, for the subset of the TOA data, impacts of respective delays on the minimizing function;
        remove, based on the impacts of the respective delays, one of the receivers from the set of the receivers; and
        after removing the one of the receivers, recalculate the tag location estimate for the set of the receivers.

9. The computer program product of claim 8, wherein the computer-executable program code portions comprising program code instructions are configured to:
    determine a DQI for the recalculated tag location estimate; and
    determine whether the DQI for the recalculated tag location estimate meets the DQI threshold.

10. The computer program product of claim 8, wherein removing the one of the receivers from the set of the receivers and recalculating the tag location estimate are performed iteratively.

11. The computer program product of claim 8, wherein the computer-executable program code portions comprising program code instructions are configured to, when the DQI for the set of the receivers meets the DQI threshold, output the tag location estimate.

12. The computer program product of claim 8, wherein the computer-executable program code portions comprising program code instructions are configured to determine whether the set of the receivers includes a predetermined number of receivers prior to removing the one of the set of the receivers.

13. The computer program product of claim 8, wherein the computer-executable program code portions comprising program code instructions are configured to determine whether the set of the receivers includes a predetermined percentage of the receivers of a receiver grid prior to removing the one of the set of the receivers.

14. The computer program product of claim 8, wherein determining the impacts of respective delays on the minimizing function comprises:
   determining respective reductions in a value of the minimizing function for the delays; and
   identifying a greatest one of the reductions in the value.

15. An apparatus for determining target location in a multiple receiver target location system, the multiple receiver target location system including a plurality of location tags each associated with a respective target and a plurality of receivers, the apparatus comprising at least one processor and at least one memory including computer program code, the at least one memory and computer program code configured to, with the processor, cause the apparatus to at least:
   receive, from a plurality of receivers, time of arrival (TOA) data, associated with location tag transmissions;
   determine a set of the receivers based on the received TOA data;
   calculate a tag location estimate for the set of receivers by applying a minimizing function to a subset of the TOA data corresponding to the set of the receivers;
   determine a data quality indicator (DQI) for the tag location estimate; and
   when the DQI for the tag location estimate does not meet a DQI threshold:
      determine, for the subset of the TOA data, impacts of respective delays on the minimization function;
      remove, based on the impacts of the respective delays, one of the receivers from the set of the receivers; and
      after removing the one of the receivers, recalculate the tag location estimate for the set of the receivers.

16. The apparatus of claim 15, wherein the at least one memory and computer program code are configured to, with the processor, cause the apparatus to:
   determine a DQI for the recalculated tag location estimate; and
   determine whether the DQI for the recalculated tag location estimate meets the DQI threshold.

17. The apparatus of claim 15, wherein removing the one of the receivers from the set of the receivers and recalculating the tag location estimate are performed iteratively.

18. The apparatus of claim 15, wherein the at least one memory and computer program code are configured to, with the processor, cause the apparatus to output the tag location estimate when the DQI for the set of the receivers meets the threshold.

19. The apparatus of claim 15, wherein the at least one memory and computer program code are configured to, with the processor, cause the apparatus to determine whether the set of the receivers includes a predetermined number of receivers prior to removing the one of the set of the receivers.

20. The apparatus of claim 15, wherein the at least one memory and computer program code are configured to, with the processor, cause the apparatus to determine whether the set of the receivers includes a predetermined percentage of the receivers of a receiver grid prior to removing the one of the set of the receivers.

21. The apparatus of claim 15, wherein determining the impacts of respective delays on the minimizing function comprises:
   determining respective reductions in a value of the minimizing function for the delays; and;
   identifying a greatest one of the reductions in the value.

* * * * *